US012491237B2

(12) United States Patent
Abraham et al.

(10) Patent No.: US 12,491,237 B2
(45) Date of Patent: Dec. 9, 2025

(54) VACCINE COMPOSITIONS AND METHODS FOR THE TREATMENT AND PREVENTION OF URINARY TRACT INFECTIONS

(71) Applicant: Duke University, Durham, NC (US)

(72) Inventors: Soman Abraham, Durham, NC (US); Jianxuan Wu, Durham, NC (US)

(73) Assignee: Duke University, Durham, NC (US)

( * ) Notice: Subject to any disclaimer, the term of this patent is extended or adjusted under 35 U.S.C. 154(b) by 310 days.

(21) Appl. No.: 18/277,150

(22) PCT Filed: Feb. 16, 2022

(86) PCT No.: PCT/US2022/016639
§ 371 (c)(1),
(2) Date: Aug. 14, 2023

(87) PCT Pub. No.: WO2022/178020
PCT Pub. Date: Aug. 25, 2022

(65) Prior Publication Data
US 2024/0131135 A1 Apr. 25, 2024
US 2024/0226260 A9 Jul. 11, 2024

Related U.S. Application Data

(60) Provisional application No. 63/149,692, filed on Feb. 16, 2021.

(51) Int. Cl.
| | |
|---|---|
| *A61K 39/108* | (2006.01) |
| *A61K 39/00* | (2006.01) |
| *A61K 39/02* | (2006.01) |
| *A61K 39/39* | (2006.01) |
| *A61P 31/04* | (2006.01) |
| *A61P 31/10* | (2006.01) |

(52) U.S. Cl.
CPC ........ *A61K 39/0266* (2013.01); *A61K 39/025* (2013.01); *A61K 39/0258* (2013.01); *A61K 39/39* (2013.01); *A61P 31/04* (2018.01); *A61K 2039/55561* (2013.01)

(58) Field of Classification Search
CPC .............. A61K 39/0266; A61K 39/025; A61K 39/0258; A61K 39/39; A61K 2039/55561; A61K 2039/54; A61K 2039/55555; A61K 2039/55572; A61K 2039/541; A61K 2039/55538; A61P 31/04; A61P 13/10; A61P 13/02; Y02A 50/30
See application file for complete search history.

(56) References Cited

U.S. PATENT DOCUMENTS

| | | | |
|---|---|---|---|
| 10,137,192 B2 | 11/2018 | Eldridge et al. | |
| 10,245,319 B2 | 4/2019 | Abraham et al. | |
| 2003/0138449 A1 | 7/2003 | Langermann et al. | |
| 2008/0044440 A1 | 2/2008 | Dunkley | |
| 2010/0166788 A1 | 7/2010 | Scorza et al. | |
| 2016/0015797 A1 | 1/2016 | Bouzari | |
| 2019/0275134 A1 | 9/2019 | Poolman et al. | |

FOREIGN PATENT DOCUMENTS

| | | | |
|---|---|---|---|
| WO | WO 2005/100568 A1 | 10/2005 | |
| WO | WO 2015/124769 A1 | 8/2015 | |
| WO | WO 2017/035181 A1 | 3/2017 | |

OTHER PUBLICATIONS

International Search Report and Written Opinion for Application No. PCT/US2022/016639 dated Jul. 11, 2022 (20 pages).
Abraham et al., "Conservation of the D-mannose-adhesion protein among type 1 fimbriated members of the family Enterobacteriaceae," Nature, 1988, 336(6200): 682-4.
Abraham et al., "The nature of immune responses to urinary tract infections," Nature Reviews Immunology, 2015, 15(10): 655-63.
Al-Badr et al., "Recurrent urinary tract infections management in women: a review," Sultan Qaboos University Medical Journal, 2013, 13(3): 359.
Antunes-Lopes et al., "The role of urinary microbiota in lower urinary tract dysfunction: a systematic review," European urology focus, 2018.
Bameri et al., "High Yield Expression and Modified Purification of Novel Recombinant Truncated Protein FimH.MrpH against Urinary Tract Infections by *Escherichia coli* and Proteus mirabilis," Journal of Clinical and Diagnostic Research, 2018, 12(1): KC06-KC09.
Barber et al., "Urinary tract infections: current and emerging management strategies, " Clinical infectious diseases, 2013, 57(5): 719-724.
Bashyam, "Th1/Th2 cross-regulation and the discovery of IL-10," Journal of Experimental Medicine, 2007, 204(2): 237.
Biot et al., "Preexisting BCG-specific T cells improve intravesical immunotherapy for bladder cancer," Science translational medicine, 2012, 4(137):137ra72.
Bobat et al., "Soluble flagellin, FliC, induces an Ag-specific Th2 response, yet promotes T-bet- regulated Th1 clearance of *Salmonella typhimurium* infection," European journal of immunology, 2011, 41(6): 1606-18.
Bode et al., "CpG DNA as a vaccine adjuvant. Expert review of vaccines," 2011, 10(4): 499-511.
Borody et al., "Recurrence of duodenal ulcer and Campylobacter pylori infection after eradication," Medical Journal of Australia, 1989, 151(8): 431-5.

(Continued)

*Primary Examiner* — Jeffrey T. Palenik

(74) *Attorney, Agent, or Firm* — Michael Best & Friedrich LLP

(57) ABSTRACT

Disclosed herein are vaccine compositions for the treatment and prevention of urinary tract infections (UT!s) and methods for delivery of the vaccine compositions. Moreover, the disclosure provides adjuvant compositions for vaccines to modulate cellular responses, such as an immune response.

29 Claims, 22 Drawing Sheets

Specification includes a Sequence Listing.

(56) References Cited

OTHER PUBLICATIONS

Brubaker et al., "The urinary microbiota: a paradigm shift for bladder disorders?," Current opinion in obstetrics & gynecology, 2016, 28(5): 407.
Brumbaugh et al., "Preventing urinary tract infection: progress toward an effective *Escherichia coli* vaccine," Expert review of vaccines, 2012, 11(6): 663-76.
Chan et al., "Mast cell interleukin-10 drives localized tolerance in chronic bladder infection," Immunity, 2013, 38(2): 349-59.
Cusumano et al., "Treatment and prevention of urinary tract infection with orally active FimH inhibitors," Science translational medicine, 2011, 3(109): 109ra115-109ra115.
Derré et al., "Intravesical Bacillus Calmette Guerin Combined with a Cancer Vaccine Increases Local T-Cell Responses in Non-muscle-Invasive Bladder Cancer Patients," Clinical Cancer Research, 2017, 23(3): 717-25.
Domingos-Pereira et al., "Intravesical Ty21a Vaccine Promotes Dendritic Cells and T Cell—Mediated Tumor Regression in the MB49 Bladder Cancer Model," Cancer immunology research, 2019, 7(4): 621-9.
Eldridge et al., "Safety and immunogenicity of an adjuvanted *Escherichia coli* adhesin vaccine in healthy women with and without histories of recurrent urinary tract infections: results from a first-in-human phase 1 study," Human Vaccines & Immunotherapeutics, 2020, pp. 1-9.
Farber et al., "Human memory T cells: generation, compartmentalization and homeostasis," Nature Reviews Immunology, 2014, 14(1): 24-35.
FDA, "BOTOX (onabotulinumtoxinA) for injection, for intramuscular, intradetrusor, or intradermal use. Highlights of prescribing information," <https://www.accessdata.fda.gov/drugsatfda_docs/label/2017/103000s5302Ibl.pdf> Revised Apr. 2017, 37 pages.
Fields et al., "Cutting edge: changes in histone acetylation at the IL-4 and IFN-γ loci accompany Th1/Th2 differentiation," The Journal of Immunology, 2002, 169(2): 647-50.
Flores-Mireles et al., "Urinary tract infections: epidemiology, mechanisms of infection and treatment options," Nature reviews microbiology, 2015, 13(5): 269-284.
Forsyth et al., "Optimization of an Experimental Vaccine to Prevent *Escherichia coli* Urinary Tract Infection," Mbio, 2020, 11:e00555-20.
Foxman, "Recurring urinary tract infection: incidence and risk factors," American journal of public health, 1990, 80(3): 331-3.
Foxman, "Urinary tract infection syndromes: occurrence, recurrence, bacteriology, risk factors, and disease burden," Infectious disease clinics of North America, 2014, 28(1): 1-3.
Gautam et al., "Vaginal mucosal vaccine for recurrent urinary tract infections," Indian journal of urology: IJU: journal of the Urological Society of India, 2007, 23(3): 335.
GlobeNewsWire, "Global Urinary Tract Infection Treatment Market is Expected to Reach USD 12.41 Billion by 2025 : Fior Markets," <https://www.globenewswire.com/news-release/2019/09/12/1914668/0/en/Global-Urinary-Tract-Infection-Treatment-Market-is-Expected-to-Reach-USD-12-41-Billion-by-2025-Fior-Markets.html> Sep. 12, 2019.
Hedlund et al., "Recurrence of pneumonia in middle-aged and elderly adults after hospital-treated pneumonia: aetiology and predisposing conditions," Scandinavian journal of infectious diseases, 1997, 29(4): 387-92.
Hegazy et al., "Circulating and tissue-resident CD4+ T cells with reactivity to intestinal microbiota are abundant in healthy individuals and function is altered during inflammation," Gastroenterology, 2017, 153(5): 1320-37.
Honda et al., "The microbiota in adaptive immune homeostasis and disease," Nature, 2016, 535(7610): 75-84.
Hooton, "Recurrent urinary tract infection in women," International journal of antimicrobial agents, 2001, 17(4): 259-68.
Huttner et al., "Safety, immunogenicity, and preliminary clinical efficacy of a vaccine against extraintestinal pathogenic *Escherichia coli* in women with a history of recurrent urinary tract infection: a randomised, single-blind, placebo-controlled phase 1b trial," The Lancet infectious diseases, 2017, 17(5): 528-537.
Ikahelmo et al., "Recurrence of Urinary Tract Infection in a Primary Care Setting: Analysis of a I-Year Follow-up of 179 Women," Clinical Infectious Diseases, 1996, 22(1): 91-9.
Karam et al., "Assessment of immune responses of the flagellin (FliC) fused to FimH adhesin of Uropathogenic *Escherichia coli*," Molecular immunology, 2013, 54(1): 32-9.
Karam et al., "Vaccination with recombinant FimH fused with flagellin enhances cellular and humoral immunity against urinary tract infection in mice," Vaccine, 2013, 31(8): 1210-6.
Kates et al., "Intravesical BCG induces CD4+ T-cell expansion in an immune competent model of bladder cancer," Cancer immunology research, 2017, 5(7): 594-603.
Kaye et al., "The clinical spectrum of *Staphylococcus aureus* pulmonary infection," Chest, 1990, 97(4): 788-92.
Klein et al., "Urinary tract infections: microbial pathogenesis, host—pathogen interactions and new treatment strategies," Nature Reviews Microbiology, 2020, 18: 1-6.
Kumamoto et al., "CD301b+ dermal dendritic cells drive T helper 2 cell-mediated immunity," Immunity, 2013, 39(4): 733-43.
Langermann et al., "Prevention of Mucosal *Escherichia coli* Infection by FimH-Adhesin-Based Systemic Vaccination," Science, American Association for the Advancement of Science, 1997, 276(5312): 607-611.
Langermann et al., "Vaccination utilizing the FimCH complex as a strategy to prevent *Escherichia coli* urinary tract infections," The Journal of infectious diseases, 2001, 183(Supplement_1): S84-6.
Langermann et al., "Vaccination with fimh adhesin protects cynomolgus monkeys from colonization and infection by uropathogenic *Eschevichia coli*," The Journal of infectious diseases, 2000, 181(2): 774-8.
Li et al., "Preoperative Th1/Th2 and related cytokines: Prediction value in postoperative febrile UTI after ureteroscopy in patients with ureteral calculi," Advances in Clinical and Experimental Medicine, 2019, 28(1): 125-32.
Lukens et al., "Adapt(ed) to repair—TH 2 immune responses in the bladder promote recurrent infections," Nature Immunology, 2020, 18: 1-3.
Macatonia et al., "Dendritic cells produce IL-12 and direct the development of Th1 cells from naive CD4+ T cells," The Journal of Immunology, 1995, 154(10): 5071-9.
Mike et al., "Siderophore vaccine conjugates protect against uropathogenic *Escherichia coli* urinary tract infection," Proceedings of the National Academy of Sciences, 2016, 113(47): 13468-73.
Mocé-Llivina et al., "Survival of bacterial indicator species and bacteriophages after thermal treatment of sludge and sewage," Applied and Environmental microbiology, 2003, 69(3): 1452-6.
Mohrs et al., "Analysis of type 2 immunity in vivo with a bicistronic IL-4 reporter," Immunity, 2001, 15(2): 303-11.
Mount et al., "Combination of adjuvants: the future of vaccine design," Expert review of vaccines, 2013, 12(7): 733-46.
Mulvey et al., "Establishment of a persistent *Escherichia coli* reservoir during the acute phase of a bladder infection," Infection and immunity, 2001, 69(7): 4572-9.
Niv et al., "Helicobacter pylori recurrence in developed and developing countries: meta-analysis of 13C-urea breath test follow-up after eradication," Helicobacter, 2008, 13(1): 56-61.
Normark et al., "Genetics of digalactoside-binding adhesin from a uropathogenic *Escherichia coli* strain," Infection and immunity, 1983, 41(3): 942-9.
Poggio et al., "Intranasal immunization with a recombinant truncated FimH adhesin adjuvanted with CpG oligodeoxynucleotides protects mice against uropathogenic *Escherichia coli* challenge," Canadian Journal of Microbiology, 2006, 52(11): 1093-1102.
Redelman-Sidi et al., "The mechanism of action of BCG therapy for bladder cancer—a current perspective," Nature Reviews Urology, 2014, 11(3): 153.
Reinhardt et al., "A novel model for IFN-γ—mediated autoinflammatory syndromes," The Journal of Immunology, 2015, 194(5): 2358-68.
Reinhardt et al., "Cytokine-secreting follicular T cells shape the antibody repertoire," Nature immunology, 2009, 10(4): 385-93.

(56) References Cited

OTHER PUBLICATIONS

Ribes et al., "Intraperitoneal prophylaxis with CpG oligodeoxynucleotides protects neutropenic mice against intracerebral *Escherichia coli* K1 infection," Journal of neuroinflammation, 2014, 11(1): 14.
Rodriguez-Creixems et al., "Recurrent pneumococcal bacteremia: a warning of immunodeficiency," Archives of internal medicine, 1996, 156(13): 1429-34.
Saleh, "UTI Vaccine Shows Promise," <https://www.verywellhealth.com/uti-vaccine-shows-promise-4147399> webpage available as early as Jul. 17, 2019. Updated Jun. 7, 2021.
Sarkissian et al., "UTI patients have pre-existing antigen-specific antibody titers against UTI vaccine antigens," Vaccine, 2019, 37(35): 4937-46.
Schembri et al., "Expression and purification of the mannose recognition domain of the FimH adhesin," FEMS Microbiology Letters, 2000, 188(2): 147-151.
Sen et al., "Selective and site-specific mobilization of dermal dendritic cells and Langerhans cells by Th1-and Th2-polarizing adjuvants," Proceedings of the National Academy of Sciences, 2010, 107(18): 8334-9.
Sequoia Vaccines, "Treatment begins with prevention," <https://www.sequoiavaccines.com/> webpage available as early as Aug. 6, 2018.
Simmering et al., The increase in hospitalizations for urinary tract infections and the associated costs in the United States, 1998-2011, Open forum infectious diseases, 2017, 4(1): ofw281.
Sivick et al., "Waging war against uropathogenic *Escherichia coli*: winning back the urinary tract. Infection and immunity," 2010, 78(2): 568-85.
St John et al., "Reprograming immunity to food allergens," Journal of Allergy and Clinical Immunology, 2018, 141(5): 1936-9.
Uehling et al., "Vaginal immunization of monkeys against urinary tract infection with a multi-strain vaccine," The Journal of urology, 1994, 151(1): 214-6.
Wu et al., "A highly polarized TH 2 bladder response to infection promotes epithelial repair at the expense of preventing new infections," Nature immunology, 2020, 21(6): 671-683.
Wu et al., "The multiple antibacterial activities of the bladder epithelium," Annals of translational medicine, 2017, 5(2).
Wynn et al., "An IL-12-based vaccination method for preventing fibrosis induced by schistosome infection," Nature, 1995, 376(6541): 594-6.
Zar et al., "A comparison of vancomycin and metronidazole for the treatment of Clostridium difficile-associated diarrhea, stratified by disease severity," Clinical Infectious Diseases, 2007, 45(3): 302-7.
Zhu et al., "CD4 T cells: fates, functions, and faults," Blood, 2008, 112(5): 1557-69.

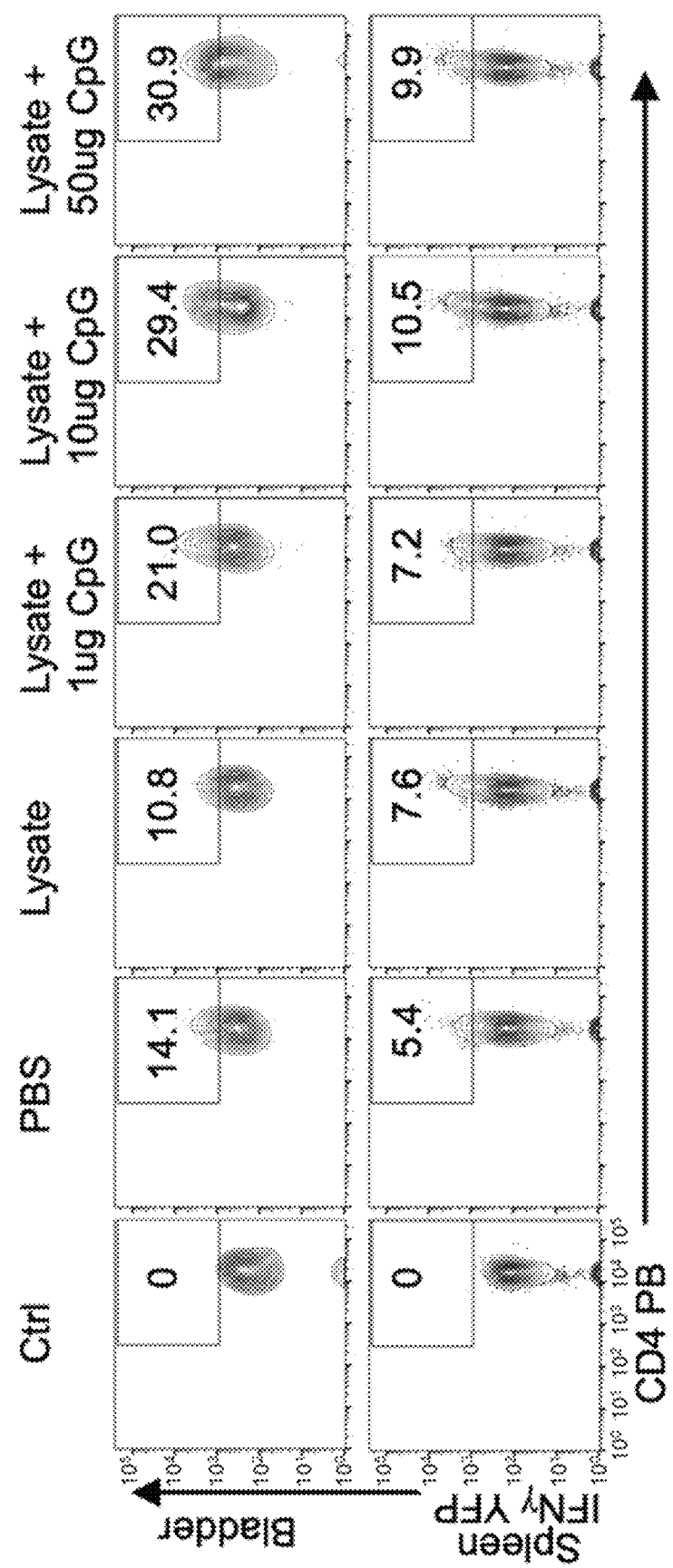

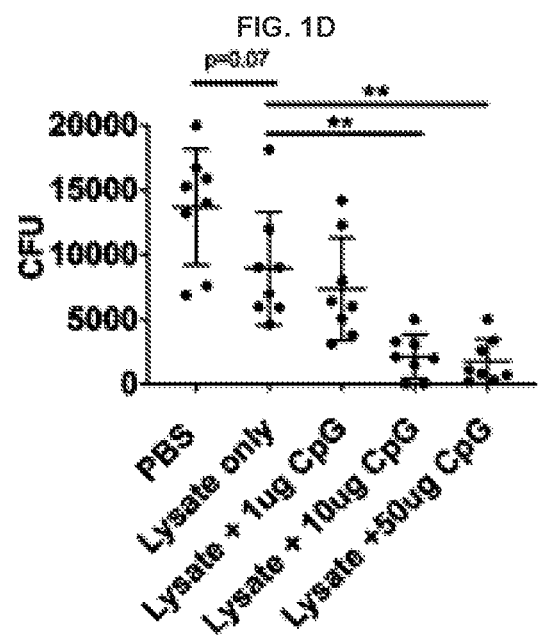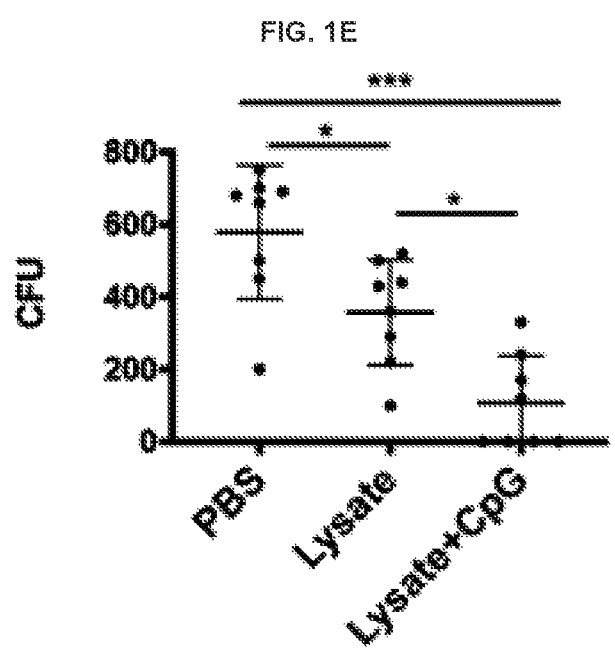

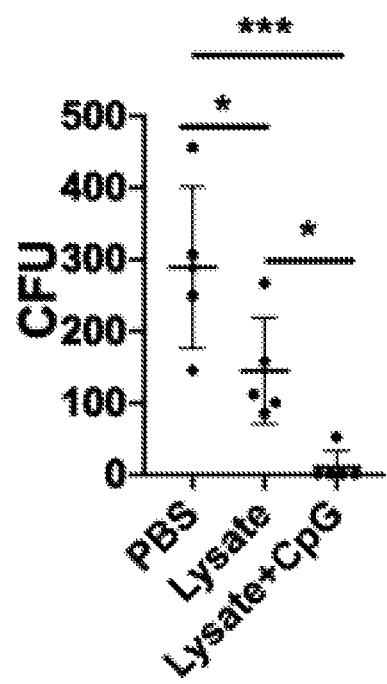

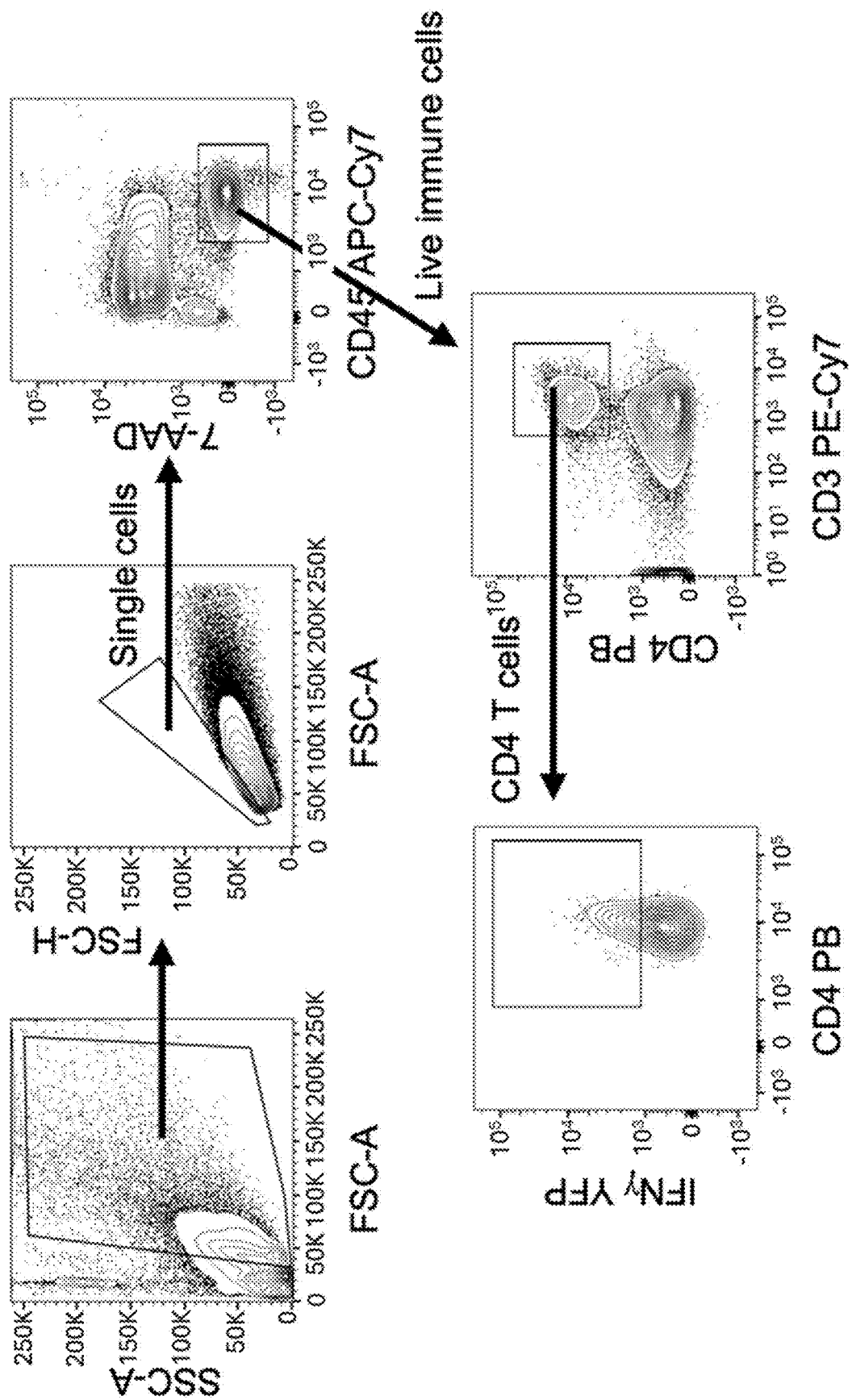

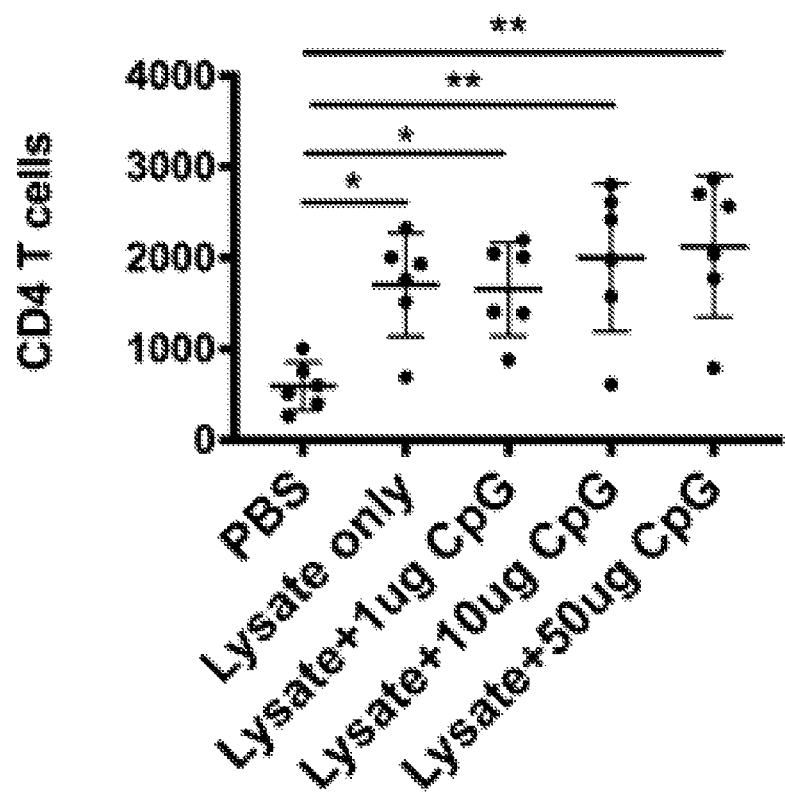

SEQUENCE LISTING

<160> NUMBER OF SEQ ID NOS: 8

<210> SEQ ID NO 1
<211> LENGTH: 903
<212> TYPE: DNA
<213> ORGANISM: Escherichia coli

<400> SEQUENCE: 1

```
atgaaacgag ttattaccct gtttgctgta ctgctgatgg gctggtcggt aaatgcctgg      60
tcattcgcct gtaaaaccgc caatggtaca gctatcccta ttggcggtgg cagcgctaat     120
gtttatgtaa accttgcgcc cgtcgtgaat gtggggcaaa acctggtcgt agatctttcg     180
acgcaaatct tttgccataa cgattatccg gaaaccatta cagactatgt cacactgcaa     240
cgaggctcgg cttatggcgg cgtgttatct aattttccg ggaccgtaaa atatagtggc      300
agtagctatc catttcctac caccagcgaa acgccgcgcg ttgtttataa ttcgagaacg     360
gataagccgt ggccggtggc gctttatttg acgcctgtga gcagtgcggg cggggtggcg     420
attaaagctg gctcattaat tgccgtgctt attttgcgac agaccaacaa ctataacagc     480
gatgatttcc agtttgtgtg gaatatttac gccaataatg atgtggtggt gcccactggc      540
ggctgtgatg tttctgctcg tgatgtcacc gttactctgc cggactaccc tggttcagtg     600
ccaattcctc ttaccgttta ttgtgcgaaa agccaaaacc tggggtatta cctctccggc     660
acaaccgcag atgcgggcaa ctcgatttc accaataccg cgtcgttttc accagcgcag     720
```

```
ggcgtcggcg tacagttgac gcgcaacggt acgattattc cagcgaataa cacggtatcg    780
ttaggagcag taggaacttc ggcggtaagt ctgggattaa cggcaaatta cgcacgtacc    840
ggagggcagg tgactgcagg gaatgtgaaa tcgattattg gcgtgacttt tgtttatcaa    900
taa                                                                  903

<210> SEQ ID NO 2
<211> LENGTH: 300
<212> TYPE: PRT
<213> ORGANISM: Escherichia coli

<400> SEQUENCE: 2

Met Lys Arg Val Ile Thr Leu Phe Ala Val Leu Leu Met Gly Trp Ser
1               5                   10                  15

Val Asn Ala Trp Ser Phe Ala Cys Lys Thr Ala Asn Gly Thr Ala Ile
            20                  25                  30

Pro Ile Gly Gly Gly Ser Ala Asn Val Tyr Val Asn Leu Ala Pro Val
        35                  40                  45

Val Asn Val Gly Gln Asn Leu Val Val Asp Leu Ser Thr Gln Ile Phe
    50                  55                  60

Cys His Asn Asp Tyr Pro Glu Thr Ile Thr Asp Tyr Val Thr Leu Gln
65                  70                  75                  80

Arg Gly Ser Ala Tyr Gly Gly Val Leu Ser Asn Phe Ser Gly Thr Val
                85                  90                  95

Lys Tyr Ser Gly Ser Ser Tyr Pro Phe Pro Thr Thr Ser Glu Thr Pro
            100                 105                 110

Arg Val Val Tyr Asn Ser Arg Thr Asp Lys Pro Trp Pro Val Ala Leu
        115                 120                 125

Tyr Leu Thr Pro Val Ser Ser Ala Gly Gly Val Ala Ile Lys Ala Gly
    130                 135                 140

Ser Leu Ile Ala Val Leu Ile Leu Arg Gln Thr Asn Asn Tyr Asn Ser
145                 150                 155                 160

Asp Asp Phe Gln Phe Val Trp Asn Ile Tyr Ala Asn Asn Asp Val Val
                165                 170                 175

Val Pro Thr Gly Gly Cys Asp Val Ser Ala Arg Asp Val Thr Val Thr
            180                 185                 190

Leu Pro Asp Tyr Pro Gly Ser Val Pro Ile Pro Leu Thr Val Tyr Cys
        195                 200                 205

Ala Lys Ser Gln Asn Leu Gly Tyr Tyr Leu Ser Gly Thr Thr Ala Asp
    210                 215                 220

Ala Gly Asn Ser Ile Phe Thr Asn Thr Ala Ser Phe Ser Pro Ala Gln
225                 230                 235                 240

Gly Val Gly Val Gln Leu Thr Arg Asn Gly Thr Ile Ile Pro Ala Asn
                245                 250                 255

Asn Thr Val Ser Leu Gly Ala Val Gly Thr Ser Ala Val Ser Leu Gly
            260                 265                 270

Leu Thr Ala Asn Tyr Ala Arg Thr Gly Gly Gln Val Thr Ala Gly Asn
        275                 280                 285

Val Gln Ser Ile Ile Gly Val Thr Phe Val Tyr Gln
    290                 295                 300

<210> SEQ ID NO 3
<211> LENGTH: 519
<212> TYPE: DNA
<213> ORGANISM: Artificial Sequence
```

<220> FEATURE:
<223> OTHER INFORMATION: Synthetic

<400> SEQUENCE: 3

```
atggccatga aacgagttat taccctgttt gctgtactgc tgatgggctg gtcggtaaat      60
gcctggtcat tcgcctgtaa aaccgccaat ggtaccgcta tccctattgg cggtggcagc     120
gccaatgttt atgtaaacct tgcgcccgtc gtgaatgtgg ggcaaaacct ggtcgtggat     180
ctttcgacgc aaatcttttg ccataacgat tatccggaaa ccattacaga ctatgtcaca     240
ctgcaacgag gctcggctta tggcggcgtg ttatctaatt tttccgggac cgtaaaatat     300
agtggcagta gctatccatt tcctaccacc agcgaaacgc cgcgcgttgt ttataattcg     360
agaacggata agccgtggcc ggtggcgctt tatttgacgc ctgtgagcag tgcgggcggg     420
gtggcgatta agctggctc attaattgcc gtgcttattt tgcgacagac caacaactat     480
aacagcgatc tggaagttct gttccagggg cccctcgag                            519
```

<210> SEQ ID NO 4
<211> LENGTH: 163
<212> TYPE: PRT
<213> ORGANISM: Artificial Sequence
<220> FEATURE:
<223> OTHER INFORMATION: Synthetic

<400> SEQUENCE: 4

```
Met Lys Arg Val Ile Thr Leu Phe Ala Val Leu Leu Met Gly Trp Ser
 1               5                  10                  15

Val Asn Ala Trp Ser Phe Ala Cys Lys Thr Ala Asn Gly Thr Ala Ile
            20                  25                  30

Pro Ile Gly Gly Gly Ser Ala Asn Val Tyr Val Asn Leu Ala Pro Val
        35                  40                  45

Val Asn Val Gly Gln Asn Leu Val Val Asp Leu Ser Thr Gln Ile Phe
    50                  55                  60

Cys His Asn Asp Tyr Pro Glu Thr Ile Thr Asp Tyr Val Thr Leu Gln
65                  70                  75                  80

Arg Gly Ser Ala Tyr Gly Gly Val Leu Ser Asn Phe Ser Gly Thr Val
                85                  90                  95

Lys Tyr Ser Gly Ser Ser Tyr Pro Phe Pro Thr Thr Ser Glu Thr Pro
            100                 105                 110

Arg Val Val Tyr Asn Ser Arg Thr Asp Lys Pro Trp Pro Val Ala Leu
        115                 120                 125

Tyr Leu Thr Pro Val Ser Ser Ala Gly Gly Val Ala Ile Lys Ala Gly
    130                 135                 140

Ser Leu Ile Ala Val Leu Ile Leu Arg Gln Thr Asn Asn Tyr Asn Ser
145                 150                 155                 160

Asp Asp Phe
```

<210> SEQ ID NO 5
<211> LENGTH: 606
<212> TYPE: DNA
<213> ORGANISM: Artificial Sequence
<220> FEATURE:
<223> OTHER INFORMATION: Synthetic

<400> SEQUENCE: 5

```
atgaaatacc tgctgccgac cgctgctgct ggtctgctgc tcctcgctgc ccagccggcg      60
atggccatgg ccatgaaacg agttattacc ctgtttgctg tactgctgat gggctggtcg     120
```

```
gtaaatgcct ggtcattcgc ctgtaaaacc gccaatggta ccgctatccc tattggcggt    180
ggcagcgcca atgtttatgt aaaccttgcg cccgtcgtga atgtggggca aaacctggtc    240
gtggatcttt cgacgcaaat cttttgccat aacgattatc cggaaaccat tacagactat    300
gtcacactgc aacgaggctc ggcttatggc ggcgtgttat ctaattttc cgggaccgta    360 aaatatagtg gcagtagcta tccatttcct accaccagcg aaacgccgcg cgttgtttat    420
aattcgagaa cggataagcc gtggccggtg gcgctttatt tgacgcctgt gagcagtgcg    480
ggcggggtgg cgattaaagc tggctcatta attgccgtgc ttattttgcg acagaccaac    540
aactataaca gcgatctgga agttctgttc caggggcccc tcgagcacca ccaccaccac    600
cactga                                                              606

<210> SEQ ID NO 6
<211> LENGTH: 64
<212> TYPE: DNA
<213> ORGANISM: Artificial Sequence
<220> FEATURE:
<223> OTHER INFORMATION: Synthetic

<400> SEQUENCE: 6
atgaaatacc tgctgccgac cgctgctgct ggtctgctgc tcctcgctgc ccagccggcg     60
atgg                                                                  64

<210> SEQ ID NO 7
<211> LENGTH: 18
<212> TYPE: DNA
<213> ORGANISM: Artificial Sequence
<220> FEATURE:
<223> OTHER INFORMATION: Synthetic

<400> SEQUENCE: 7
caccaccacc accaccac                                                  18

<210> SEQ ID NO 8
<211> LENGTH: 24
<212> TYPE: DNA
<213> ORGANISM: Artificial Sequence
<220> FEATURE:
<223> OTHER INFORMATION: Synthetic

<400> SEQUENCE: 8
ctggaagttc tgttccaggg gccc                                           24
```

VACCINE COMPOSITIONS AND METHODS FOR THE TREATMENT AND PREVENTION OF URINARY TRACT INFECTIONS

CROSS-REFERENCE TO RELATED APPLICATIONS

This patent application is the U.S. national stage entry, under 35 U.S.C. § 371, of International Application Number PCT/US2022/016639, filed Feb. 16, 2022, which claims priority to U.S. Provisional Application No. 63/149,692, filed Feb. 16, 2021, the entire contents of each of which are hereby incorporated by reference.

STATEMENT REGARDING FEDERALLY SPONSORED RESEARCH

This invention was made with government support under grant R01 DK121032 awarded by the National Institutes of Health. The government has certain rights in the invention.

SEQUENCE LISTING

The sequence listing is filed with the application in electronic format only and is incorporated by reference herein. The sequence listing text file "028193-9380-WO01_As_Filed_Sequence_Listing" was created on Feb. 15, 2022, and is 7.9 Kbytes in size.

FIELD

This disclosure relates to vaccine compositions for the treatment and prevention of urinary tract infections (UTIs) and methods for delivery of the vaccine compositions. Moreover, the disclosure provides adjuvant compositions for vaccines to modulate cellular responses, such as an immune response.

INTRODUCTION

Urinary tract infections (UTIs) are one of the most common bacterial infections and primarily afflict women. Indeed, as many as 50% of women will experience at least one UTI during their lifetime. These infections mainly afflict adult females but also occur in children and elderly persons. Along with their high incidence rate, UTIs have markedly higher recurrence rates (ranging from 27% to 44%) compared with recurrence rates of infections at other body sites. UTIs are typically initiated when certain gut-derived bacteria, such as uropathogenic *Escherichia coli* (UPEC), reach the bladder through the urethra and proliferate in urine, followed by invasion into bladder epithelial cells (BECs). Studies in experimental UTI models have revealed that a small population of quiescent UPEC can persist in BECs for months, even after resolution of an acute infection, which provides a nidus for future infection.

Although antibiotic treatment is usually highly effective in resolving acute UTIs, it is not effective in preventing new infections or recurrence of previous infections. Therefore, for many decades, much attention was focused on developing an efficacious vaccine in animal models to evoke long-term protective humoral immunity against UTI pathogens. Several UPEC antigens were found to be immunogenic, evoking strong antibody responses that significantly reduced colonization of the bladder and kidneys following bacterial challenge. One of the more efficacious vaccine candidates revealed in these studies is FimH, a determinant of bacterial binding to BECs expressed not only by *E. coli*, but also by many other species of enterobacteria. Despite the promise of vaccines and initiation of several human trials using various bacterial components as vaccine antigens, an effective UTI vaccine remains unavailable.

Currently, there is a lack of effective adjuvants to boost immunogenicity of bacterial antigens to levels that are protective against UTI. Further, vaccines delivered via needles at parenteral sites may not evoke adequate antibody production and bacteria-clearing T cells in the bladder. Thus, there is a need for a localized UTI vaccine that effectively boosts the immune system to clear uropathogens and prevent new and recurrent infections.

SUMMARY

In an aspect, the disclosure relates to a recombinant vaccine composition comprising: a truncated fimbrial protein, wherein the truncated fimbrial protein may be amino acids 1-163 of FimH; and, an adjuvant that induces and stimulates a T helper cell 1 (Th1) response.

In some embodiments, the adjuvant may be a CpG oligodeoxynucleotide (ODN), monophosphoryl lipid A (MPLA), imiquimod, gardiquimod, R848, nucleotide binding oligomerization domain containing 2 (NOD2) ligands, IL-12, or a combination thereof. In some embodiments, the CpG ODN may be CpG ODN 1826, ODN 2006, ODN 1585, ODN 2216, ODN 2395, ODN BW001, or a combination thereof. In some embodiments, the recombinant vaccine composition may be incorporated into one or more biodegradable nanoparticles. In some embodiments, the one or more biodegradable nanoparticles may comprise heparin and chitosan. In some embodiments, a ratio of the truncated fimbrial protein to the adjuvant may be from about 10:1 to about 1:10. In some embodiments, the recombinant vaccine composition may further comprise pharmaceutically acceptable carriers, excipients, or diluents. In some embodiments, the pharmaceutically acceptable carrier may comprise liposomes. In some embodiments, the recombinant vaccine composition may further comprise one or more protein products capable of evoking protective immunity produced by a bacterium that causes a urinary tract infection (UTI).

In a further aspect, the disclosure relates to a method of treating or preventing a urinary tract infection (UTI) in a subject comprising administering to the subject a recombinant vaccine composition comprising: a truncated fimbrial protein, wherein the truncated fimbrial protein may be amino acids 1-163 of FimH; and, an adjuvant that induces and stimulates a T helper cell 1 (Th1) response; wherein the recombinant vaccine composition may be administered locally to the bladder of the subject.

In some embodiments, the recombinant vaccine composition may be administered by intramuscular injection into the bladder wall of the subject or intraluminal administration into the bladder of the subject. In some embodiments, about 0.01 mg/kg to about 100 mg/kg of the recombinant vaccine composition may be administered by intramuscular injection into the bladder wall of the subject. In some embodiments, about 0.0001 mg/kg to about 100 mg/kg of the recombinant vaccine composition may be administered by intraluminal administration into the bladder of the subject. In some embodiments, the recombinant vaccine composition may be initially administered from about 2 to about 4 times; wherein each vaccine may be administered about 1 month apart. In some embodiments, a booster dose of the recombinant vaccine composition may be administered about 6 months to about 12 months after the initial administration of the recombinant vaccine composition. In some embodiments, the adjuvant may be a CpG oligodeoxynucleotide (ODN), monophosphoryl lipid A (MPLA), imiquimod, gardiquimod, R848, nucleotide binding oligomerization domain containing 2 (NOD2) ligands, IL-12, or a combination thereof. In some embodiments, the CpG ODN may be CpG ODN 1826, ODN 2006, ODN 1585, ODN 2216, ODN 2395, ODN BW001, or a combination thereof. In some embodiments, the recombinant vaccine composition may be incorporated into one or more biodegradable nanoparticles. In some embodiments, the biodegradable nanoparticles may comprise heparin and chitosan. In some embodiments, a ratio of the truncated fimbrial protein to the adjuvant may be from about 10:1 to about 1:10. In some embodiments, the recombinant vaccine composition may further comprise one or more protein products capable of evoking protective immunity produced by a bacterium that causes UTIs. In some embodiments, the UTI may be caused by an enterobacteria that expresses FimH. In some embodiments, the enterobacteria may be one or more of *Escherichia coli* (*E. coli*), *Klebsiella pneumoniae* (*Klebsiella* spp.), *Citrobacter freundii* (*Citrobacter* spp.), and *Serratia marcescens* (*Serratia* spp.).

Another aspect of the disclosure provides a method of preparing a recombinant vaccine composition comprising the steps of: (a) providing a truncated fimbrial protein, wherein the truncated fimbrial protein may be amino acids 1-163 of FimH; and (b) combining the truncated fimbrial protein with an adjuvant that induces and stimulates a T helper cell 1 (Th1) response.

In some embodiments, the step of providing the truncated fimbrial protein may comprise: i. subcloning a polynucleotide encoding the truncated fimbrial protein into a plasmid; ii. introducing the polynucleotide into a cell; iii. expressing the truncated fimbrial protein in the cell; and iv. purifying the truncated fimbrial protein from the cell. In some embodiments, the polynucleotide sequence may be SEQ ID NO: 3. In some embodiments, the cell may be a mammalian cell, a bacterial cell, or a cell line. In some embodiments, the adjuvant may be a CpG oligodeoxynucleotide (ODN), monophosphoryl lipid A (MPLA), imiquimod, gardiquimod, R848, nucleotide binding oligomerization domain containing 2 (NOD2) ligands, IL-12, or a combination thereof. In some embodiments, the CpG ODN may be CpG ODN 1826, ODN 2006, ODN 1585, ODN 2216, ODN 2395, ODN BW001, or a combination thereof. In some embodiments, the method may further comprise incorporating the recombinant vaccine composition into one or more biodegradable nanoparticles. In some embodiments, the one or more nanoparticles may comprise heparin and chitosan. In some embodiments, a ratio of the truncated fimbrial protein to the adjuvant may be from about 10:1 to about 1:10. In some embodiments, the method may further comprise adding pharmaceutically acceptable carriers, excipients, or diluents to the recombinant vaccine composition. In some embodiments, the method may further comprise combining the truncated fimbrial protein and the adjuvant with one or more protein products capable of evoking protective immunity produced by a bacterium that causes a urinary tract infection (UTI).

The disclosure provides for other aspects and embodiments that will be apparent in light of the following detailed description and accompanying figures.

BRIEF DESCRIPTION OF THE DRAWINGS

FIG. 1 shows that intravesical vaccination with bacterial lysates and CpG induced strong local Th1 responses in the bladder. FIG. 1A, FIG. 1B, and FIG. 1C show data for naïve Great mice that were intravesically vaccinated with J96 lysates and different amounts of CpG three times, and then challenged with UPEC J96. Bladders and spleens were collected for flow cytometry analysis on day 3 after challenge. Wildtype (WT) C57BL/6J mice infected with J96 were used as controls for YFP gating. FIG. 1D shows data for naïve WT mice that were intravesically vaccinated with UPEC J96 lysates and combined with increasing amount of CpG three times, and then intravesically challenged with UPEC J96. Bladders were collected to determine bacterial load on day 3 post challenge. FIG. 1E shows data for naïve WT mice that were intravesically vaccinated three times with PBS, UPEC J96 lysates, or UPEC J96 lysates combined with 10 µg of CpG, and then intravesically challenged with UPEC J96. Bladders were collected to determine bacterial load on day 14 after challenge. Each data point represents one mouse. Data are shown as mean±SD. Data were analyzed by an ordinary one-way ANOVA with Tukey's multiple comparison post hoc test. *$P<0.05$; $P<0.01$; *$P<0.001$. "ns," not significant.

FIG. 2 shows that Th1 bladder responses are more critical for bacterial clearance than antibody-dependent responses with intravesical vaccination.

FIG. 3 shows that local vaccination induced a stronger Th1 response and better bacterial clearance than subcutaneous vaccination.

FIG. 4 shows that intravesical vaccination with bacterial lysate and CpG of repeatedly infected mice induced strong bladder Th1 responses that significantly improved bacterial clearance on bacterial challenge. FIG. 4F shows data from naïve WT mice that were intravesically infected with UPEC J96 three times, then vaccinated three times with PBS, UPEC J96 lysates alone, or UPEC J96 lysates with 10 µg of CpG. These mice were once again challenged with UPEC J96. Bladders were collected to determine bacterial load on day 14 postchallenge. Each data point represents one mouse. Data are shown as mean±SD. Data were analyzed by ordinary one-way ANOVA with Tukey's multiple comparison post hoc test. *P<0.05; P<0.01; *P<0.001. "ns," not significant.

FIG. 6 shows flow cytometry analysis of CD4 T cells in immunized bladder. FIG. 6A shows a diagram of the gating strategy which was based on a previous study (Wu J., et al., *Nat. Immunol.* 21, 671-683 (2020)). Briefly, single cells were first gated based on FSC and SSC. Then, live immune cells were gated as 7-AAD-CD45+. Finally, CD3+CD4+ IFNg+ cells were analyzed. FIG. 6B shows the same immunizations that were performed as in FIG. 1. The number of total CD4 T cells in each bladder of each immunization group was shown. Each data point represents one mouse, data are shown as mean±SD. Data were analyzed by an ordinary one-way ANOVA with the Tukey's multiple comparison post-hoc test. *p<0.05, **p<0.01.

FIG. 8 shows that the combination of CpG and IL-12 with J96 lysate induces a strong Th1 response but does not inhibit the Th2 response.

DETAILED DESCRIPTION

Figure 1B:
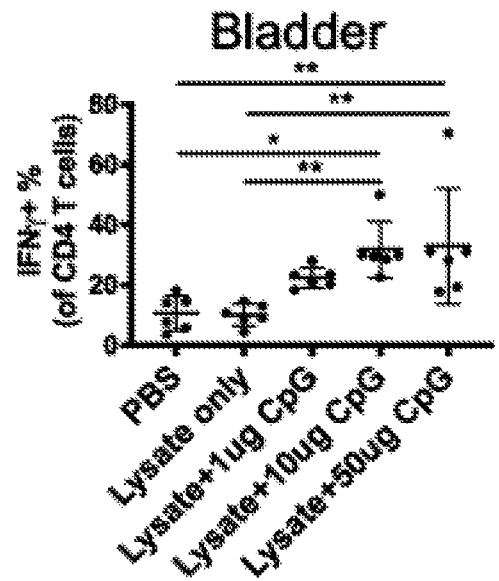

Provided herein are vaccines comprising antigens from uropathogenic bacteria. These antigens may be combined with a Th1-skewing adjuvant. This combination corrects aberrant Th2-biased bladder immune responses to infection and promotes protection against UTIs. Also described herein is an effective mode of local vaccine delivery. Local delivery of a vaccine as described herein is effective even in subjects that experienced multiple UTIs and displayed pronounced aberrant bladder immune responses. Localized vaccination with one or more uropathogenic bacteria antigens to induce bladder Th1 responses effectively combats UTIs, especially in UTI-prone subjects.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having." "has." "can," "contain(s)," and variants thereof, as used herein, are intended to be open-ended transitional phrases, terms, or words that do not preclude the possibility of additional acts or structures. The singular forms "a," "and," and "the" include plural references unless the context clearly dictates otherwise. The present disclosure also contemplates other embodiments "comprising." "consisting of," and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "about" or "approximately" as used herein as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In certain aspects, the term "about" refers to a range of values that fall within 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). Alternatively, "about" can mean within 3 or more than 3 standard deviations, per the practice in the art. Alternatively, such as with respect to biological systems or processes, the term "about" can mean within an order of magnitude, preferably within 5-fold, and more preferably within 2-fold, of a value.

"Adjuvant" refers to an agent that, when present in an effective amount, increases the antigenic response; a substance enhancing the immune response to an antigen; or an agent that stimulates antibody production to an antigen. Numerous naming conventions or terminologies exist in the art. Without reference to a specific naming convention, the adjuvant compositions as described herein may simply be referred to as adjuvant formulations or adjuvant preparations.

"Amino acid" as used herein refers to naturally occurring and non-natural synthetic amino acids, as well as amino acid analogs and amino acid mimetics that function in a manner similar to the naturally occurring amino acids. Naturally occurring amino acids are those encoded by the genetic code. Amino acids can be referred to herein by either their commonly known three-letter symbols or by the one-letter symbols recommended by the IUPAC-IUB Biochemical Nomenclature Commission. Amino acids include the side chain and polypeptide backbone portions.

The terms "antigen" and "immunogen" are used interchangeably and refer to any compound to which a cellular or humoral immune response is to be directed against.

"Coding sequence" or "encoding nucleic acid" as used herein means the nucleic acids (RNA or DNA molecule) that comprise a nucleotide sequence which encodes a protein. The coding sequence can further include initiation and termination signals operably linked to regulatory elements including a promoter and polyadenylation signal capable of directing expression in the cells of an individual or mammal to which the nucleic acid is administered. The coding sequence may be codon optimized.

"Complement" or "complementary" as used herein means a nucleic acid can mean Watson-Crick (e.g., A-T/U and C-G) or Hoogsteen base pairing between nucleotides or nucleotide analogs of nucleic acid molecules. "Complementarity" refers to a property shared between two nucleic acid sequences, such that when they are aligned antiparallel to each other, the nucleotide bases at each position will be complementary.

The terms "control," "reference level," and "reference" are used herein interchangeably. The reference level may be a predetermined value or range, which is employed as a benchmark against which to assess the measured result. "Control group" as used herein refers to a group of control subjects. The predetermined level may be an average from a control group. The healthy or normal levels or ranges for a target or for a protein activity may be defined in accordance with standard practice. A control may be a subject or cell without a vaccine as detailed herein. A control may be a subject, or a sample therefrom, whose disease state is known. The subject, or sample therefrom, may be healthy, diseased, diseased prior to treatment, diseased during treatment, or diseased after treatment, or a combination thereof.

"Functional" and "full-functional" as used herein describes protein that has biological activity. A "functional gene" refers to a gene transcribed to mRNA, which is translated to a functional protein.

"Genetic construct" or "plasmid" as used herein refers to the DNA or RNA molecules that comprise a polynucleotide that encodes a protein. The coding sequence includes initiation and termination signals operably linked to regulatory elements including a promoter and polyadenylation signal capable of directing expression in the cells in which the nucleic acid molecule is administered.

A "humoral response" refers to an antibody-mediated immune response directed towards various regions of an antigenic determinant.

"Identical" or "identity" as used herein in the context of two or more polynucleotide or polypeptide sequences means that the sequences have a specified percentage of residues that are the same over a specified region. The percentage may be calculated by optimally aligning the two sequences, comparing the two sequences over the specified region, determining the number of positions at which the identical residue occurs in both sequences to yield the number of matched positions, dividing the number of matched positions by the total number of positions in the specified region, and multiplying the result by 100 to yield the percentage of sequence identity. In cases where the two sequences are of different lengths or the alignment produces one or more staggered ends and the specified region of comparison includes only a single sequence, the residues of single sequence are included in the denominator but not the numerator of the calculation. When comparing DNA and RNA, thymine (T) and uracil (U) may be considered equivalent. Identity may be performed manually or by using a computer sequence algorithm such as BLAST or BLAST 2.0.

"Liposome" generally refers to vesicles that consist of a lipid bilayer membrane surrounding a hydrophilic core.

"Nucleic acid" or "oligonucleotide" or "polynucleotide" as used herein means at least two nucleotides covalently linked together. The depiction of a single strand also defines the sequence of the complementary strand. Thus, a polynucleotide also encompasses the complementary strand of a depicted single strand. Many variants of a polynucleotide may be used for the same purpose as a given polynucleotide. Thus, a polynucleotide also encompasses substantially identical polynucleotides and complements thereof. A single strand provides a probe that may hybridize to a target sequence under stringent hybridization conditions. Thus, a polynucleotide also encompasses a probe that hybridizes under stringent hybridization conditions. Polynucleotides may be single stranded or double stranded or may contain portions of both double stranded and single stranded sequence. The polynucleotide can be nucleic acid, natural or synthetic, DNA, genomic DNA, cDNA, RNA, or a hybrid, where the polynucleotide can contain combinations of deoxyribo- and ribo-nucleotides, and combinations of bases including, for example, uracil, adenine, thymine, cytosine, guanine, inosine, xanthine hypoxanthine, isocytosine, and isoguanine. Polynucleotides can be obtained by chemical synthesis methods or by recombinant methods.

"Open reading frame" refers to a stretch of codons that begins with a start codon and ends at a stop codon. In eukaryotic genes with multiple exons, introns are removed, and exons are then joined together after transcription to yield the final mRNA for protein translation. An open reading frame may be a continuous stretch of codons. In some embodiments, the open reading frame only applies to spliced mRNAs, not genomic DNA, for expression of a protein.

"Operably linked" as used herein means that expression of a gene is under the control of a promoter with which it is spatially connected. A promoter may be positioned 5' (upstream) or 3' (downstream) of a gene under its control. The distance between the promoter and a gene may be approximately the same as the distance between that promoter and the gene it controls in the gene from which the promoter is derived. As is known in the art, variation in this distance may be accommodated without loss of promoter function. Nucleic acid or amino acid sequences are "operably linked" (or "operatively linked") when placed into a functional relationship with one another. For instance, a promoter or enhancer is operably linked to a coding sequence if it regulates, or contributes to the modulation of, the transcription of the coding sequence. Operably linked DNA sequences are typically contiguous, and operably linked amino acid sequences are typically contiguous and in the same reading frame. However, since enhancers generally function when separated from the promoter by up to several kilobases or more and intronic sequences may be of variable lengths, some polynucleotide elements may be operably linked but not contiguous. Similarly, certain amino acid sequences that are non-contiguous in a primary polypeptide sequence may nonetheless be operably linked due to, for example folding of a polypeptide chain. With respect to fusion polypeptides, the terms "operatively linked" and "operably linked" can refer to the fact that each of the components performs the same function in linkage to the other component as it would if it were not so linked.

A "peptide" or "polypeptide" is a linked sequence of two or more amino acids linked by peptide bonds. The polypeptide can be natural, synthetic, or a modification or combination of natural and synthetic. Peptides and polypeptides include proteins such as binding proteins, receptors, and antibodies. The terms "polypeptide", "protein," and "peptide" are used interchangeably herein. "Primary structure" refers to the amino acid sequence of a particular peptide. "Secondary structure" refers to locally ordered, three dimensional structures within a polypeptide. These structures are commonly known as domains, for example, enzymatic domains, extracellular domains, transmembrane domains, pore domains, and cytoplasmic tail domains. "Domains" are portions of a polypeptide that form a compact unit of the polypeptide and are typically 15 to 350 amino acids long. Exemplary domains include domains with enzymatic activity or ligand binding activity. Typical domains are made up of sections of lesser organization such as stretches of beta-sheet and alpha-helices. "Tertiary structure" refers to the complete three-dimensional structure of a polypeptide monomer. "Quaternary structure" refers to the three-dimensional structure formed by the noncovalent association of independent tertiary units. A "motif" is a portion of a polypeptide sequence and includes at least two amino acids. A motif may be 2 to 20, 2 to 15, or 2 to 10 amino acids in length. A domain may be comprised of a series of the same type of motif.

"Promoter" as used herein means a synthetic or naturally derived molecule which is capable of conferring, activating or enhancing expression of a nucleic acid in a cell. A promoter may comprise one or more specific transcriptional regulatory sequences to further enhance expression and/or to alter the spatial expression and/or temporal expression of same. A promoter may also comprise distal enhancer or repressor elements, which may be located as much as several thousand base pairs from the start site of transcription. A promoter may be derived from sources including viral, bacterial, fungal, plants, insects, and animals. A promoter may regulate the expression of a gene component constitutively, or differentially with respect to cell, the tissue or organ in which expression occurs or, with respect to the developmental stage at which expression occurs, or in response to external stimuli such as physiological stresses, pathogens, metal ions, or inducing agents.

"Recognition sequence" as used herein refers to a DNA, RNA, or amino acid sequence to which a structural motif of a binding domain exhibits binding specificity. For example, the recognition sequence for the HRV3C protease is LeuGluValLeuPheGlnθGlyPro, where the arrow indicates the cleavage site.

The term "recombinant" when used with reference to, for example, a cell, nucleic acid, protein, vaccine, or vector, indicates that the cell, nucleic acid, protein, vaccine, or vector, has been modified by the introduction of a nucleic acid or protein or the alteration of a native nucleic acid or protein, or that the cell is derived from a cell so modified. Thus, for example, recombinant cells express genes or proteins that are not found within the native (naturally occurring) form of the cell.

"Sample" or "test sample" as used herein can mean any sample in which the presence and/or level of a target is to be detected or determined or any sample comprising a vaccine or component thereof as detailed herein. Samples may include liquids, solutions, emulsions, or suspensions. Samples may include a medical sample. Samples may include any biological fluid or tissue, such as blood, whole blood, fractions of blood such as plasma and serum, muscle, interstitial fluid, sweat, saliva, urine, tears, synovial fluid, bone marrow, cerebrospinal fluid, nasal secretions, sputum, amniotic fluid, bronchoalveolar lavage fluid, gastric lavage, emesis, fecal matter, lung tissue, peripheral blood mononuclear cells, total white blood cells, lymph node cells, spleen cells, tonsil cells, cancer cells, tumor cells, bile, digestive fluid, skin, or combinations thereof. In some embodiments, the sample comprises an aliquot. In other embodiments, the sample comprises a biological fluid. Samples can be obtained by any means known in the art. The sample can be used directly as obtained from a patient or can be pre-treated, such as by filtration, distillation, extraction, concentration, centrifugation, inactivation of interfering components, addition of reagents, and the like, to modify the character of the sample in some manner as discussed herein or otherwise as is known in the art.

"Subject" and "patient" as used herein interchangeably refers to any vertebrate, including, but not limited to, a mammal that wants or is in need of the herein described compositions or methods. The subject may be a human or a non-human. The subject may be a vertebrate. The subject may be a mammal. The mammal may be a primate or a non-primate. The mammal can be a non-primate such as, for example, cow, pig, camel, llama, hedgehog, anteater, platypus, elephant, alpaca, horse, goat, rabbit, sheep, hamsters, guinea pig, cat, dog, rat, and mouse. The mammal can be a primate such as a human. The mammal can be a non-human primate such as, for example, monkey, cynomolgous monkey, rhesus monkey, chimpanzee, gorilla, orangutan, and gibbon. The subject may be of any age or stage of development, such as, for example, an adult, an adolescent, or an infant. The subject may be male. The subject may be female. In some embodiments, the subject has a urinary tract infection (UTI). The subject may be undergoing other forms of treatment.

As used herein, the terms "Th1-skewing adjuvant" or "adjuvant that induces and stimulates a Th1 response" may be used interchangeably herein and refer to any adjuvant or combination of adjuvants capable of eliciting a Th1-mediated immune response in a subject. Examples of Th1-skewing adjuvants include, but are not limited to PRR ligands (natural and/or synthetic), TLR4 ligands (e.g., MPLA [monophosphoryl lipid A]), TLR7/8 ligands (e.g., midazoquinolines [i.e. imiquimod, gardiquimod and R848]), TLR9 ligands (e.g., Oligodeoxynucleotides containing specific CpG motifs [CpG ODNs such as ODN 1826 and ODN 2006, tlrl-1585-1, etc.), NOD2 ligands, and the like.

"Treatment" or "treating" or "treatment" when referring to protection of a subject from a disease, means suppressing, repressing, reversing, alleviating, ameliorating, or inhibiting the progress of disease, or completely eliminating a disease. A treatment may be either performed in an acute or chronic way. The term also refers to reducing the severity of a disease or symptoms associated with such disease prior to affliction with the disease. Preventing the disease involves administering a composition of the present invention to a subject prior to onset of the disease. Suppressing the disease involves administering a composition of the present invention to a subject after induction of the disease but before its clinical appearance. Repressing or ameliorating the disease involves administering a vaccine of the present invention to a subject after clinical appearance of the disease.

"Truncated FimH" refers to the FimH protein truncated to include at least about 25 to about 163 amino acid residues from the first 163 amino acids of FimH. With reference to truncated FimH, the FimH protein truncated to include at least 9% of the FimH protein, at least 30% of the FimH protein, or at least 60% of the FimH protein.

"Urinary Tract Infections" or "UTI" or "acute cystitis" refer to a medical diagnosis characterized by one or more of the following signs and symptoms: irritative voiding such as frequency, urgency, and dysuria; gross hematuria; or elicited suprapubic tenderness upon examination; and/or one or more of the following laboratory results: positive urine dipstick test from clean catch or catheter urine specimen; microscopic urinalysis from clean catch or catheter urine specimen (leukocytes, bacteria, and casts may be present); or urine culture from clean catch or catheter urine specimen for E. coli at $\geq 10^3$ CFU/mL.

As used herein, the term "uropathogenic E. coli" or "UPEC" refers to bacteria genetically related pathogenic E. coli strains that are commonly associated with UTIs. In general, UPEC strains differ from commensal E. coli strains in that the former possess extragenetic material, often on pathogenicity-associated islands (PAIs), which code for gene products that may contribute to bacterial pathogenesis. Some of these genes allow UPEC to express determinants that are proposed to play roles in disease (e.g., UTI), such as hemolysins, secreted proteins, specific lipopolysaccharide and capsule types, iron acquisition systems, fimbrial adhesions, and the like. As used herein, "UPEC antigens" comprise any protein, toxin, or other foreign substance that can induce an immune response in a subject. Examples include, but are not limited to, UPEC lysates, UPEC specific antigens, such as FimH (e.g., ab236920, truncated FimH), and the like.

"Variant" used herein with respect to a polynucleotide means (i) a portion or fragment of a referenced nucleotide sequence (e.g., "truncated"); (ii) the complement of a referenced nucleotide sequence or portion thereof; or (iii) a nucleic acid that is substantially identical to a referenced nucleic acid or the complement thereof.

"Variant" with respect to a peptide or polypeptide that differs in amino acid sequence by the insertion, deletion, or conservative substitution of amino acids, but retain at least one biological activity. A variant may also be called a "truncated" protein or polypeptide. Variant may also mean a protein with an amino acid sequence that is substantially identical to a referenced protein with an amino acid sequence that retains at least one biological activity. Representative examples of "biological activity" include the ability to be bound by a specific antibody or polypeptide or to promote an immune response. Variant can mean a functional fragment thereof.

"Vaccine" or "vaccine composition" refers to a composition that improves immunity to a disease or infection. The vaccine compositions are immunogenic compositions that elicit immune responses and antibody production toward the antigen of the composition.

"Vector" as used herein means a nucleic acid sequence containing an origin of replication. A vector may be a bacterial vector or a viral vector. A vector may be a DNA or RNA vector. A vector may be a self-replicating extrachromosomal vector, and preferably, is a DNA plasmid. For example, the vector may encode a bacterial protein or variant thereof.

Unless otherwise defined herein, scientific and technical terms used in connection with the present disclosure shall have the meanings that are commonly understood by those of ordinary skill in the art. For example, any nomenclatures used in connection with, and techniques of, cell and tissue culture, molecular biology, immunology, microbiology, genetics, and protein and nucleic acid chemistry and hybridization described herein are those that are well known and commonly used in the art. The meaning and scope of the terms should be clear; in the event however of any latent ambiguity, definitions provided herein take precedent over any dictionary or extrinsic definition. Further, unless otherwise required by context, singular terms shall include pluralities and plural terms shall include the singular.

2. RECOMBINANT VACCINE COMPOSITION

Provided herein are recombinant vaccine compositions. The recombinant vaccine may include a fimbrial protein, an adjuvant that induces and stimulates a Th1 response, or a combination thereof. The recombinant vaccine composition may further comprise one or more protein products capable of evoking protective immunity produced by a bacterium that causes a UTI. The protein products may be one or more of flagella antigens, hemolysin A, outer membrane receptors involved in iron acquisition, other bacterial adhesin proteins, and the like.

a. Uropathogenic Bacteria and Fimbrial Proteins

UTIs are among the most common bacterial infections worldwide. UTI infections are primarily caused by uropathogenic bacteria. Such bacteria may colonize the vaginal and periurethral area and ascend the urinary tract, resulting in a UTI. The bacteria's ability to attach to the mucosal surface is essential for colonization and the ability to remain in the urinary tract. Most bacteria isolated from patients with UTIs have one or more adherence properties. Adhesins are cell-surface components or appendages of bacteria that facilitate adhesion or adherence to other cells or to surfaces. Adhesins are a type of virulence factor. Adhesion may depend on the recognition by type 1 fimbriae adhesin on bacteria of mannose-containing residues in the urinary slime. A second adherence property involves attachment to urinary tract epithelial cells. This may depend on the recognition of globo-series glycolipids in the epithelial cell surface. Possession of this adherence factor is strongly related to virulence.

The best characterized bacterial adhesion is the type 1 fimbrial, FimH. This adhesion is responsible for D-mannose sensitive adhesion. The bacterium synthesizes a precursor protein consisting of 300 amino acids and then processes the protein by removing several signal peptides ultimately leaving a 279 amino acid protein. Mature FimH is displayed on the bacterial surface as a component of the type 1 fimbirial organelle. FimH is folded into two domains: the N terminal adhesive domain plays the main role in surface recognition and the C-terminal domain is responsible for organelle integration. A tetrapeptide loop links the two domains. Additionally, a carbohydrate binding pocket has been identified at the tip of the N-terminal adhesive domain. Several enterobacteria implicated in causing UTIs express the type 1 fimbrial adhesin FimH, such as uropathogenic isolates like uropathogenic *E. coli*, *Klebsiella pneumoniae* (*Klebsiella* spp.), *Citrobacter freundii* (*Citrobacter* spp.), and *Serratia marcescens* (*Serratia* spp.).

The fimbrial protein may be truncated. The fimbrial protein may retain all of the biological activity of the full length, fully functional fimbrial protein. The fimbrial protein may be taken from an uropathogenic bacteria such as *E. coli*, *Klebsiella pneumoniae* (*Klebsiella* spp.), *Citrobacter freundii* (*Citrobacter* spp.), and *Serratia marcescens* (*Serratia* spp.). The fimbrial protein may be FimH. The fimbrial protein DNA sequence may have at least 50% identity, at least 55% identity, at least 60% identity, at least 65% identity, at least 70% identity, at least 75% identity, at least 80% identity, at least 85% identity, at least 90% identity, at least 95% identity, or 100% identity with SEQ ID NO: 1 or SEQ ID NO: 3. The fimbrial protein amino acid sequence may have at least 50% identity, at least 55% identity, at least 60% identity, at least 65% identity, at least 70% identity, at least 75% identity, at least 80% identity, at least 85% identity, at least 90% identity, at least 95% identity, or 100% identity with any one of SEQ ID NO: 2 or SEQ ID NO: 4. The truncated fimbrial protein may be encoded by SEQ ID NO: 3. The truncated fimbrial protein amino acid sequence may be SEQ ID NO: 4.

The fimbrial protein as described herein may be encoded by or comprised within a genetic construct. The genetic construct, such as a plasmid or expression vector, may comprise a nucleic acid that encodes the fimbrial protein. In certain embodiments, a genetic construct encodes a truncated fimbrial protein. The genetic construct may comprise a polynucleotide sequence of SEQ ID NO: 5.

b. T Helper Cells (Th Cells)

CD4+ Th cells are divided into two subgroups, type I helper T lymphocytes (Th1) and type II helper T cells (Th2). Both Th1 and Th2 cells are differentiated from common T helper precursor cells (Thp). The differentiation of Th cells is affected by antigen concentration, co-stimulatory molecules, transcription factors, and cytokines.

Th1 cells secret IFN-γ, IL-2, IL-3, TNF-α, and TNF-β. Th1 cells stimulate the cellular immune response, participate in the inhibition of macrophage activation, and stimulate B cells to produce IgM, IgG1. Th1 cell differentiation may be stimulated by IFN-γ, IL-12, IL-18, and STAT4.

Th2 cells secret IL-4, IL-10, IL-5, IL-9, and IL-13. Th2 stimulates the humoral immune response, promotes B cell proliferation, and induces antibody production (e.g., via IL-4). It can also induce differentiation and proliferation of mast cells (e.g., via IL-3 and IL-4), and the differentiation and proliferation of eosinophilic leukocytes (e.g., via IL-5). Th2 cell differentiation may be stimulated by IL-4, IL-13, T1/ST2, and SOCS.

In some embodiments, the Th1-skewing adjuvant may be a CpG oligodeoxynucleotide (ODN), monophosphoryl lipid A (MPLA), imiquimod, gardiquimod, R848, nucleotide binding oligomerization domain containing 2 (NOD2) ligands, IL-12, or a combination thereof. In some embodiments, the CpG ODN may be CpG ODN 1826, ODN 2006, ODN 1585, ODN 2216, ODN 2395, ODN BW001, or a combination thereof.

In some embodiments, the recombinant vaccine composition may comprise a ratio of the fimbrial protein to the adjuvant from about 15:1 to about 1:15, from about 10:1 to about 1:10, from about 5:1 to about 1:5, or from about 2:1 to about 1:2.

3. PHARMACEUTICAL COMPOSITIONS

Further provided herein are pharmaceutical compositions comprising the above-described vaccine compositions. In some embodiments, the pharmaceutical composition may comprise about 0.001 mg to about 10,000 mg of the vaccine composition. The vaccine compositions as detailed herein, or at least one component thereof, may be formulated into pharmaceutical compositions in accordance with standard techniques well known to those skilled in the pharmaceutical art. The pharmaceutical compositions can be formulated according to the mode of administration to be used. The recombinant vaccine composition may comprise pharmaceutically acceptable excipients.

The pharmaceutically acceptable excipient may be functional molecules as vehicles, adjuvants, carriers, or diluents. The term "pharmaceutically acceptable carrier," may be a non-toxic, inert solid, semi-solid or liquid filler, diluent, encapsulating material or formulation auxiliary of any type. Pharmaceutically acceptable carriers include, for example, nanoparticles, liposomes, diluents, lubricants, binders, disintegrants, colorants, flavors, sweeteners, antioxidants, preservatives, glidants, solvents, suspending agents, wetting agents, surfactants, emollients, propellants, humectants, powders, pH adjusting agents, and combinations thereof. In some embodiments, liposomes may be used.

In some embodiments, an additional adjuvant may be incorporated with a vaccine composition as described herein in the pharmaceutical composition. In embodiments, the additional adjuvants and carriers share no immune epitopes with the immunogen/target antigen, but can provide further stimulation of the immune response to a vaccine composition as described herein. Suitably, this formulation comprises combining one or more buffers, low molecular weight polypeptides, proteins, amino acids, carbohydrates including glucose or dextrans, chelating agents such as EDTA, and other excipients. While a carrier can act as an adjuvant, carriers can generally be distinguished from adjuvants in that carriers comprise water insoluble macromolecular particulate structures which aggregate the antigen. Typical carriers may include aluminum hydroxide, latex particles, bentonite, and liposomes. Saponin derivatives are also suitable adjuvants.

The vaccine composition may be incorporated into one or more nanoparticles. In some embodiments, the nanoparticle may comprise heparin and chitosan. The ratio of heparin and chitosan in the nanoparticle can be varied and adjusted to provide for desired physical characteristics of the nanoparticle (e.g., size such as volume, surface area, surface charge, stability, etc.). In embodiments the ratio of heparin to chitosan can be from about 2:1, about 1.5:1, about 1:1, about 1:1.5, or about 1:2. The relative mass ratio of heparin to chitosan may be about 0.2 to about 5. The nanoparticles may be biocompatible. The nanoparticles may be biodegradable. In certain embodiments, the nanoparticles are not chemically cross-linked. The nanoparticles may be about 50 nm to about 10 μm in diameter, or about 150 nm to about 5 μm in diameter. The nanoparticles that may be used herein are further described in U.S. Pat. No. 10,245,319, which is incorporated herein by reference in its entirety.

The pharmaceutical composition optionally can be sterile. The pharmaceutical composition can be frozen or lyophilized for storage and reconstituted in a suitable sterile carrier prior to use. Suitable compositions include aqueous and non-aqueous isotonic sterile solutions, which can contain anti-oxidants, buffers, suspending agents, solubilizers, thickening agents, stabilizers, and/or preservatives. Stabilizers may include gelatin and albumin. The compositions can be generated in accordance with conventional techniques described in, e.g., Remington: The Science and Practice of Pharmacy, 21st Edition, Lippincott Williams & Wilkins, Philadelphia, PA (2001).

Certain injectable compositions are aqueous isotonic solutions or suspensions, and suppositories are advantageously prepared from fatty emulsions or suspensions. Said compositions may be sterilized and/or contain adjuvants, such as preserving, stabilizing, wetting or emulsifying agents, solution promoters, salts for regulating the osmotic pressure and/or buffers. In addition, they may also contain other therapeutically valuable substances. Said compositions may be prepared according to conventional mixing, granulating, or coating methods, respectively, and contain about 0.1-100%, or about 0.1-75%, or about 1-50%, of the vaccine composition. In cases where pharmaceutical compositions are injectable pharmaceutical compositions, they are sterile, pyrogen free, and particulate free. An isotonic formulation is preferably used. Generally, additives for isotonicity may include sodium chloride, dextrose, mannitol, sorbitol and lactose. In some cases, isotonic solutions such as phosphate buffered saline are used.

The pharmaceutical compositions may, if desired, be presented in a pack or dispenser device which may contain one or more unit dosage forms containing the compound(s). The pack may, for example, comprise metal or plastic foil, such as a blister pack. The pack or dispenser device may be accompanied by instructions for administration.

4. ADMINISTRATION

The vaccine compositions as detailed herein, or at least one component thereof, or the pharmaceutical compositions comprising the same, may be administered to a subject. Such compositions can be administered in dosages and by techniques well known to those skilled in the medical arts taking into consideration such factors as the age, sex, weight, and condition of the particular subject, and the route of administration. The presently disclosed vaccine compositions, or at least one component thereof, or pharmaceutical compositions comprising the same, may be administered to a subject by different routes including orally, intravesically, parenterally, sublingually, transdermally, rectally, transmucosally, topically, intranasal, intravaginal, via inhalation, via buccal administration, intrapleurally, intravenous, intraarterial, intraperitoneal, subcutaneous, intradermally, epidermally, intramuscular, intranasal, intrathecal, intracranial, and intraarticular or combinations thereof. In certain embodiments, the vaccine composition or pharmaceutical composition comprising the same, is administered to a subject by intramuscular injection into the bladder wall of the subject or intravesically such as intraluminal administration into the bladder of the subject. For veterinary use, the vaccine compositions or pharmaceutical compositions comprising the same may be administered as a suitably acceptable formulation in accordance with normal veterinary practice. The veterinarian may readily determine the dosing regimen and route of administration that is most appropriate for a particular animal. The vaccine compositions or pharmaceutical compositions comprising the same may be administered by traditional syringes, employing cystoscopy, catheters, in slow-release capsules, and the like.

One or more other agents (e.g., therapeutic agents) useful for treating UTIs and/or the symptoms associated with UTIs may be administered before, concomitantly, in combination, or after administration of a vaccine composition or pharmaceutical composition comprising the same as described herein. Such agents may include, but are not limited to, antibiotics, NSAIDS, anti-inflammatory compounds, water, cranberry juice, probiotics, and vitamin C.

As used herein, the term "combination" or "in combination" the context of administration, does not restrict the order in which the one or more antigens, Th1-skewing adjuvants, or other agents are administered to a subject. For example, a first composition (e.g. comprising one or more antigens derived from UPEC) can be administered prior to (e.g., 5 minutes, 15 minutes, 30 minutes, 45 minutes, 1 hour, 2 hours, 4 hours, 6 hours, or 12 hours before), concomitantly with, or subsequent to (e.g., 5 minutes, 15 minutes, 30 minutes, 45 minutes, 1 hour, 2 hours, 4 hours, 6 hours, or 12 hours after) the administration of a second composition (e.g., comprising a Th1-skewing adjuvant) to a subject. In some embodiments, the one or more antigens derived from uropathogenic bacteria are present in a first composition, the Th1-skewing adjuvant is present in a second composition, and the first and second compositions are combined shortly before administration, such as in a mix-and-shoot application.

The vaccine compositions as detailed herein, or at least one component thereof, or the pharmaceutical compositions comprising the same, may be administered to a subject by intramuscular injection into the bladder wall at a dose of about 0.01 mg/kg to about 100 mg/kg. The vaccine compositions as detailed herein, or at least one component thereof, or the pharmaceutical compositions comprising the same, may be administered to a subject by intraluminal administration into the bladder at a dose of about 0.0001 mg/kg to about 100 mg/kg.

The Dosage amounts will typically be in the range of from about 0.0001 mg/kg/day, 0.001 mg/kg/day or 0.01 mg/kg/day to about 100 mg/kg/day, but may be higher or lower, depending upon, among other factors, the activity of the active compound(s), the bioavailability of the compound(s), its metabolism kinetics and other pharmacokinetic properties, the mode of administration and various other factors, discussed above. The dosage amount and interval may be adjusted individually to provide plasma levels of the compound(s) and/or active metabolite compound(s) which are sufficient to maintain therapeutic or prophylactic effect. In cases of local administration or selective uptake, such as local injection, the effective local concentration of compound(s) and/or active metabolite compound(s) may not be related to plasma concentration.

The vaccine composition may be administered once per month, several times per year (e.g., every month), once per day or multiple times per day, depending upon, among other things, the mode of administration, the specific indication being treated and the judgment of the prescribing physician. In particular, the vaccine compositions as detailed herein, or at least one component thereof, or the pharmaceutical compositions comprising the same, may be administered to a subject from about 2 to about 4 times in year, where each dose administration is separated by about a month. In some embodiments, a booster dose of the vaccine compositions as detailed herein, or at least one component thereof, or the pharmaceutical compositions comprising the same, are administered about 6 months to about 12 months after the initial administration of the vaccine composition. Preferably, the booster dose is administered 12 months after the initial administration dose.

5. METHODS a. Methods of Treating or Preventing a UTI

Provided herein are methods of treating or preventing a UTI in a subject. Also provided herein are methods of treating or preventing recurrent UTIs in a subject. The methods may include administering to the subject a vaccine composition as detailed herein, or at least one component thereof, or a pharmaceutical composition comprising the same. The methods may include administering to the subject a vaccine composition as detailed herein, or at least one component thereof, or a pharmaceutical composition comprising the same using the administration methods as described herein. The method may include locally administering the vaccine composition to the bladder of the subject.

The method may include inducing an immune response in the bladder of a subject. The method may include measuring the immune response in a subject by methods known in the art. The ability of the vaccine compositions and/or pharmaceutical compositions as described herein to generate an immune response in a subject can be assessed using any approach known to those of skill in the art in view of the present disclosure, and for instance described in WO 2015/124769 and WO 2017/035181. The type of immune response may be determined by identifying the IgG subclass and type of locally produced cytokines in a subject following administration of a vaccine composition as detailed herein. For example, IFNγ is indicative of a Th1 immune response.

i. Urinary Tract Infection

A UTI may occur in the lower urinary tract. This infection may be a simple cystitis (a bladder infection). A UTI may occur in upper urinary tract. This infection may be pyelonephritis (a kidney infection). Symptoms from a lower urinary tract infection may include painful urination, frequent urination, urge to urinate, fever, flank pain and a painful burning sensation in the urethra. The main agent causing UTIs may be E. coli, though other bacteria, bacteria viruses, and fungi are also reported to cause UTIs.

As described herein, the underlying basis for UTIs, in particular recurrent UTIs, is a highly Th2-biased response in the bladder that inhibits Th1-mediated bacterial clearance. Following infection, the bladder's immune response can be observed to evoke only a limited T helper type 1 (Th1) response, which is essential for bacterial clearance. The bladder's immune response is heavily skewed toward Th2 immune responses, which are largely directed at bladder tissue repair. This could explain the bacterial persistence following bladder infection and the enhanced chances for recurrence. Additionally, the magnitude of Th2-biased immune responses in the bladder increases with each infection, such that subjects with multiple UTIs are greatly compromised in their capacity to clear infection compared with their naive counterparts. Taken together, there is a significant defect in the cellular adaptive immune response of the bladder to infections, which increases with each infection.

Since the candidates for vaccination against UTIs most likely are individuals prone to recurrent UTIs, these individuals would gain limited benefit from traditional vaccination, as they already have been primed to evoke a strong Th2 immune response. To boost bacteria-clearing Th1 immune responses in the bladder of subjects already primed to evoke Th2 responses, the vaccine compositions provided herein comprise bacterial antigens combined with a Th1-skewing adjuvant and evoke a more balanced and protective immune response in a subject. Vaccines as described herein not only protect against bladder colonization, but also eliminate residual bacteria that persist following infection. To maximize the local impact of the evoked immune responses and to ensure that the activated Th1 cells will localize to the bladder, the vaccines as described herein may be administered locally to the bladder.

b. Methods of Preparing a Recombinant Vaccine Composition

Provided herein are methods of preparing a recombinant vaccine composition as described herein. The methods may include providing a truncated fimbrial protein and combining the truncated fimbrial protein with an adjuvant that induces and stimulates a Th1 response. Providing the truncated fimbrial protein may comprise subcloning a polynucleotide encoding the truncated fimbrial protein into a plasmid, introducing the polynucleotide into a cell, expressing the truncated fimbrial protein in the cell, and purifying the truncated fimbrial protein from the cell. The polynucleotide sequence may be SEQ ID NO: 3. The cell may be a mammalian cell, a bacterial cell, or a cell line.

6. EXAMPLES

The foregoing may be better understood by reference to the following examples, which are presented for purposes of illustration and are not intended to limit the scope of the invention. The present disclosure has multiple aspects and embodiments, illustrated by the appended non-limiting examples.

Example 1

Materials and Methods

Mice. C57BL/6J mice (000664) were purchased from The Jackson Laboratory. IFNγ-/- mice (002287) were obtained from The Jackson Laboratory and bred in the animal facility of Duke University. IL-4 reporter mice (4get) and IFNγ reporter mice (Great) were graciously provided by Richard Locksley, University of California San Francisco, and were bred to C57BL/6J mice for more than 10 generations. All mice were housed under specific pathogen-free (SPF) condition in the animal facility of Duke University, and 8- to 10-week-old female mice were used for all the experiments. All mouse experiments were performed in accordance with protocols approved by the Duke University Animal Care and Use Committee.

Bacterial Strain. Clinical uropathogenic *E. coli* isolate strain J96 was used for infection in the mouse UTI model (Wu J., et al., *Nat. Immunol.* 21, 671-683 (2020); Chan C. Y., et al., *Immunity* 38, 349-359 (2013); and Normark S., et al., *Infect. Immun.* 41, 942-949 (1983)). The bacteria were statically grown in Luria-Bertani broth overnight prior to infecting the mice.

Figure 5:
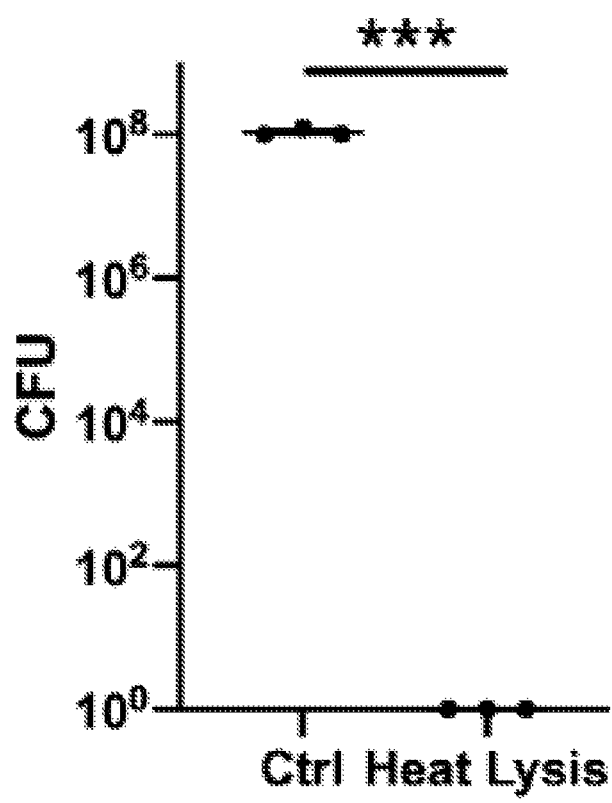
FIG. 5 shows that heat lysis treatment results in complete loss of bacteria viability. $10^8$ CFU of bacteria in PBS were either placed at room temperature (Ctrl) or treated over 60° C. (Heat Lysis) for 30 min, thereafter bacterial viability was assessed by colony counts on Difco MacConkey agar plate. After overnight incubation in 37° C., colony forming unit (CFU) was determined. Each data point represents one sample, data are shown as mean±SD. Data were analyzed by an unpaired t test. ***p<0.001.

Vaccination and Mouse UTI Model. Uropathogenic J96 lysates were prepared by heating at >60° C. for 30 min (World Health Organization, Water sanitation hygiene. Boil water: Technical brief and Mocé-Llivina L., et al., *Appl. Environ. Microbiol.* 69, 1452-1456 (2003); FIG. 5). Mice were given pentobarbital sodium (Oak Pharmaceuticals) intraperitoneally (i.p.) for anesthesia, then lysates from $1 \times 10^8$ UPEC strain J96 combined with different amounts of adjuvants (as indicated in the Brief Description of Drawings) in 50 µL of PBS were slowly introduced into their bladders through a 2-cm catheter inserted through the urethra. The vaccine was administered three times at 7-d intervals. In some experiments (as indicated in the Brief Description of Drawings), 10 µg of FimH (ab236920; Abcam) was also used with 10 µg of CpG (tlrl-1585-1; InvivoGen), and the procedure was the same as with vaccination with J96 lysate. The systemic vaccination procedure was modified from previous research (Asadi Karam M. R., et al., *Vaccine* 31, 1210-1216 (2013); and Forsyth V. S., et al., *MBio* 11, e00555-20 (2020)). In brief, 10 µg of FimH and 10 µg of CpG were administered subcutaneously into mice three times at 7-d intervals. UTI models were modified from previous research (Wu J., et al., *Nat. Immunol.* 21, 671-683 (2020); and Chan C. Y., et al., *Immunity* 38, 349-359 (2013)). In brief, at 7 d after the final vaccination, $1 \times 10^8$ J96 UPEC was intravesically introduced into mouse bladders in the same way as in the vaccination procedure. At 3 d after infection, samples were collected for analysis. For recurrent UTIs, bladder infection was intravesically induced three times at 7-d intervals. At 7 d after the final infection, vaccination and subsequent bacteria challenge were initiated.

Bacteria Load Assessment. The bladders were collected at different time points post-infection as indicated in the Brief Description of Drawings and homogenized in 0.1% Triton X-100 (Sigma-Aldrich) using zirconia silica beads for three cycles of 1.5 min each in an automatic homogenizer. Lysate underwent series dilution in PBS and was plated on Difco MacConkey agar plates. After overnight incubation in 37° C., colony-forming units (CFU) were counted. The limit of bacterial detection in this study was 10 CFU.

Flow Cytometry Analysis. Bladders and spleens were collected at different time points post-infection as indicated in the Brief Description of Drawings. Single-cell suspensions were prepared as described previously (Wu J., et al., *Nat. Immunol.* 21, 671-683 (2020)), and light was avoided during the entire process. Bladders were digested with 1 mg/mL collagenase (C7657; Sigma-Aldrich) and 200 µg/mL DNase I (DN25; Sigma-Aldrich) in RPMI 1640 medium for 1 h at 37° C. Spleens were smashed to produce single-cell suspensions. ACK lysis buffer was used to lyse red blood cells. Then samples were filtered through a 70-µm cell strainer in FACS buffer (3% heat-inactivated fetal bovine serum and 5 mM EDTA in PBS). Samples were blocked with 1% anti-mouse CD16/CD32 (BD Biosciences), 5% normal mouse serum, and 5% normal rat serum in FACS buffer for 15 min at 4° C. Then surface staining was performed with 7-AAD (BD Biosciences) and the following antibodies: APC-Cy7 conjugated to anti-mouse CD8a (53-6.7; BioLegend), and PE conjugated to anti-mouse Gr1 (RB6-8C5), PECy7 conjugated to anti-mouse CD3e (145-2C11), Pacific Blue conjugated to anti-mouse CD4 (RM4-5), BV510 conjugated to anti-mouse NK-1.1 (PK136), APC-Cy7 conjugated to anti-mouse CD45 (30-F11), and BV510 conjugated to anti-mouse I-A/I-E (M5/114.15.2) (all from BD Biosciences). All the samples were pregated by size and granularity based on forward scatter and side scatter to select single cells and then gated on 7-AAD-negative cells. Data were collected with the FACSCanto flow cytometry system (BD Biosciences) and analyzed with FlowJo software.

Enzyme-Linked Immunosorbent Assay. Bladder and serum were collected at different time points post-infection, as indicated in the Brief Description of Drawings. Then an enzyme-linked immunosorbent assay (ELISA) was performed based on previous studies (Wu J., et al., *Nat. Immunol.* 21, 671-683 (2020); Chan C. Y., et al., *Immunity* 38, 349-359 (2013); Asadi Karam M. R., et al., *Vaccine* 31, 1210-1216 (2013); and Karam M. R., et al., *Mol. Immunol.* 54, 32-39 (2013)). For IFNγ measurement, bladders were homogenized using zirconia silica beads for three cycles of 1.5 min each in an automatic homogenizer, and ELISA was performed using an IFNγ ELISA kit (XEL485; R&D Systems) following the manufacturer's instructions. Concentrations were determined by a standard curve. For IgG measurements, 96-well plates were coated overnight at 4° C. with lysate of $10^7$ J96 or 1 µg FimH (Abcam) in carbonate buffer (15 mM Na2CO3, 35 mM NaHCO3); blocked with carbonate buffer, 3% nonfat dry milk, and 0.1% Kathon for 2 h at room temperature; and then incubated at 4° C. overnight with serum samples diluted in complete sample diluent (PBS, 1% BSA, 1% nonfat dry milk, 0.05% Tween 20, and 0.1% Kathon). Plates were washed four times with wash buffer (PBS, 0.05% Tween 20, and 0.1% Kathon), after which HRP-conjugated mouse-IgG detection antibodies (Bio-Rad) diluted in secondary antibody diluent (PBS, 0.05% BSA, 0.05% Tween 20, and 0.1% Kathon) was added. Plates were incubated at room temperature for 2 h, washed four times with wash buffer, and then incubated with 3,3',5,5'-tetramethylbenzidine for 30 min, after which the reaction was stopped by sulfuric acid. Data were collected in a Synergy H1 Microplate Reader using Gen5 version 2.06 software (BioTek).

Statistics. Statistical analyses were performed using GraphPad Prism v.8.4.1. A two-tailed unpaired t test was used for comparisons between two groups, and ordinary ANOVA with a post hoc test corrected for multiple comparisons was used for comparisons among more than two groups. Each experiment was repeated independently two to three times with similar results. Detailed information is in provided in the Brief Description of Drawings. P<0.05 was considered statistically significant. Posttest P values were as follows: *P<0.05; P<0.01; *P<0.001.

Example 2

Figure 1C:
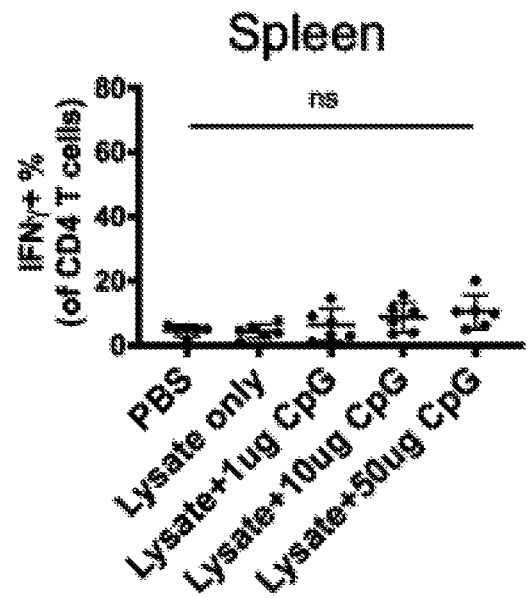

Local Vaccination with Th1-Polarizing Adjuvant can Evoke Bladder Th1 Responses Promoting Bacterial Clearance In view of the finding that the bladder's natural adaptive immune response to infection is Th2-biased, which inhibits Th1-mediated bacterial clearance capacity, a vaccine was generated to modify this response. It was hypothesized that bacteria-specific immune responses with enhanced bacteria-clearing capacity could be evoked by immunizing mice with bacterial antigens accompanied by a known Th1-polarizing adjuvant. Since vaccine-enhanced Th1 responses would be most effective when localized in the bladder, the immunization site was in the bladder. Interferon-gamma (IFNγ) reporter (Great) mice were used because regular quantification of Th1 cells in wild-type (WT) mouse bladders is challenging, as their numbers are relatively small. Great mice carry an internal ribosomal entry site (IRES)-yellow fluorescent protein (YFP) cassette tagged at the 3' end of the endogenous ifng gene, the prototype Th1 marker. Groups of mice were immunized intravesically (through the urethra) with a lysate of uropathogenic E. coli (UPEC) strain J96 suspended either in phosphate-buffered saline (PBS) or in PBS containing increasing amounts of CpG oligodeoxynucleotide (ODN), a Th1-polarizing adjuvant (FIG. 5). UPEC lysates were used as vaccine antigens here because bacterial lysates have proven protective against UTIs when administered at urogenital sites such as the vagina in clinical studies. Each mouse group was boosted with its appropriate vaccine formulation on days 7 and 14. On day 21, all the immunized mouse groups were intravesically challenged with UPEC J96. Three days later, when acute bladder inflammation had subsided, bladders were collected for flow cytometry analysis of Th1 cells ($CD3^+CD4^+IFN\gamma^+$). As a control for systemic effects of intravesical immunization, Th1 cells in the spleens of each of the mice were quantitated. WT C57BL/6J mice infected with UPEC J96 were used as negative control for YFP gating. The gating strategy is shown in FIG. 6A-B. It was observed that the presence of CpG ODN as the adjuvant significantly enhanced bladder Th1 responses in a dose-dependent manner up to 10 μg of CpG, evoking a two-fold increase over the response evoked by the lysate alone (FIG. 1A-B). In contrast, there was a minimal increase in the Th1 response in the spleen (FIG. 1C). These findings support our hypothesis that intravesical vaccination with bacterial antigens accompanied by a Th1-skewing adjuvant can evoke strong Th1 responses in the bladder.

Figure 7:
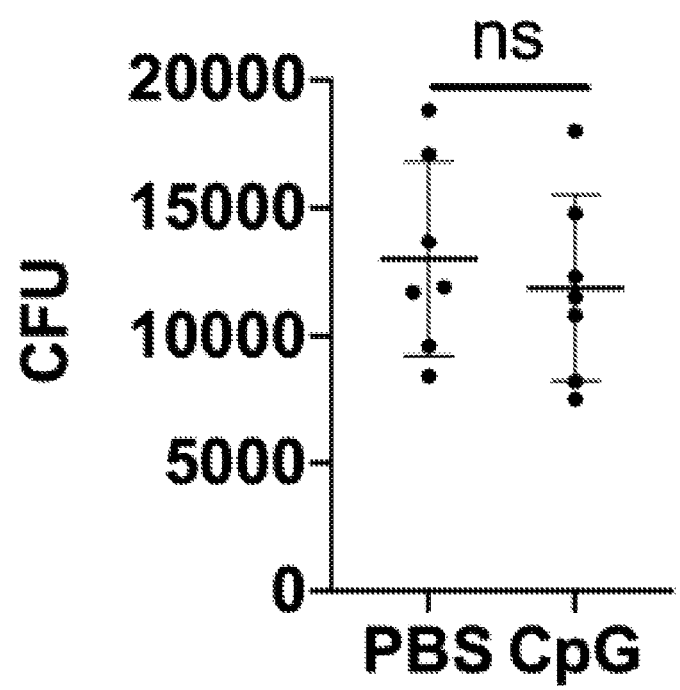
FIG. 7 shows that intravesical vaccination with CpG alone does not improve bacterial clearance. Naïve WT mice were intravesically vaccinated with PBS or 10 µg CpG three times, then intravesically challenged with UPEC J96. Bladders were collected to determine bacterial load on day 3 post challenge. Each data point represents one mouse, data are shown as mean±SD. Data were analyzed by an unpaired t test. "ns"=not significant.

To test whether this mode of vaccination promotes bacterial clearance in the bladder following infection, the above vaccination study was repeated in WT C57BL/6J mice. At 3 d after UPEC J96 challenge, bacterial loads in the mouse bladders were quantitated. It was found that mice vaccinated with a formulation composed of bacterial lysate and increasing doses of CpG significantly reduced bladder bacterial loads compared with PBS-vaccinated or lysate-alone-vaccinated mice (FIG. 1D). Also, vaccination with CpG alone did not have any significant effect on bacterial clearance (FIG. 7).

Since UPEC can persist in bladders within BECs even after apparent resolution of infection, it was investigated if given more time, the recruited Th1 cells in the bladder would further reduce residual bacteria. For this, the previous study was repeated but this time bacterial numbers were assessed on day 14 post-challenge. It was found that 50% of mice immunized with UPEC lysates and the adjuvant CpG completely cleared their bladder bacteria, which is in sharp contrast to PBS-immunized or lysate-alone-immunized mouse groups, which continued to harbor appreciable numbers of bladder bacteria (FIG. 1E). Thus, the recruitment of bacteria-specific Th1 cells to the bladder following intravesical vaccination is highly effective in promoting bacterial clearance during infection, as well as after the infection has seemingly resolved.

Example 3

Figure 2A:
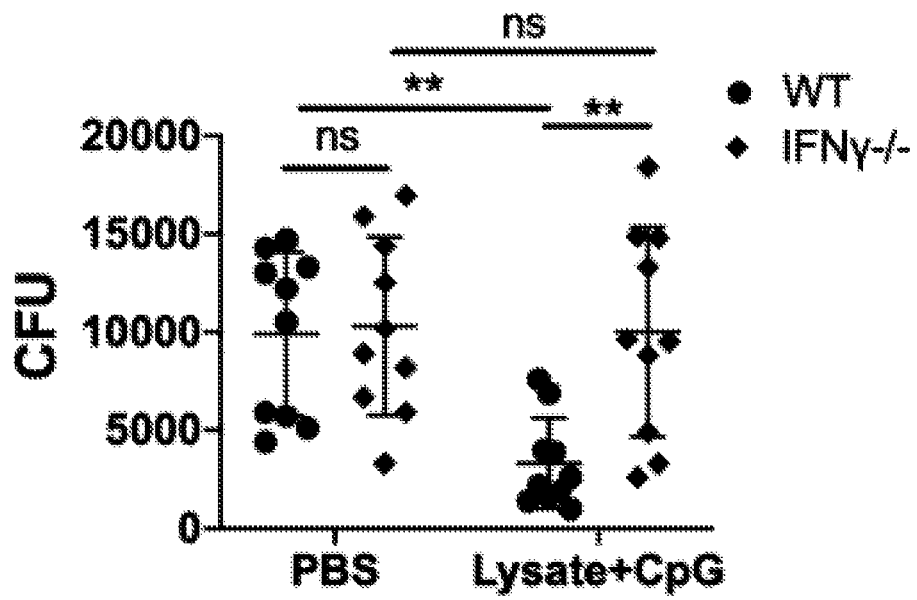
FIG. 2A shows data for intravesical vaccination with UPEC J96 lysates combined with 10 µg of CpG followed by UPEC J96 challenge in WT and IFNγ$^{-/-}$ mice. Bladders were collected to determine bacterial load on day 3 post challenge.
Figure 2B:
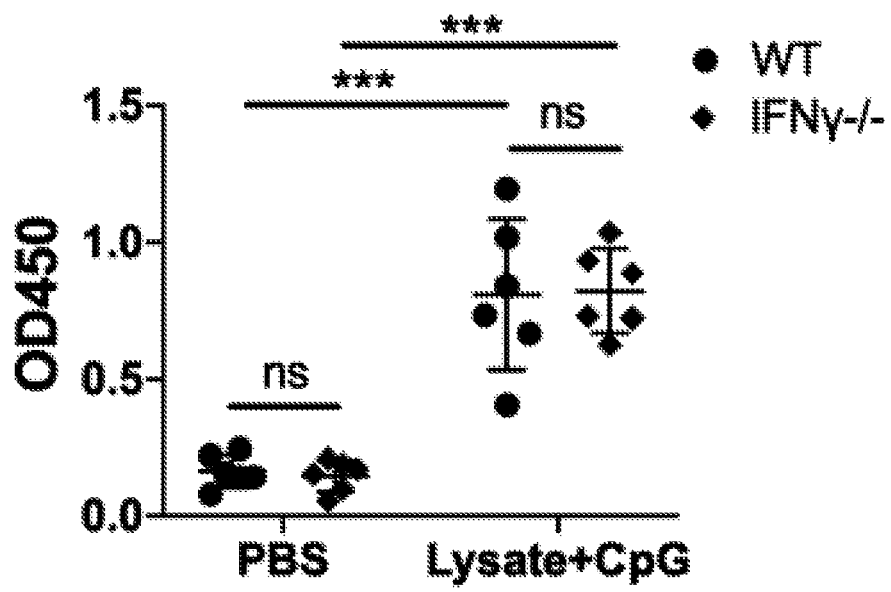
FIG. 2B shows the concentration of UPEC J96-specific IgG in serum collected from FIG. 2A by ELISA.

Bacterial Clearance Following Local Bladder Vaccination is Mainly Mediated by Th1 Activity Rather than IgG Antibody Responses Although the data herein show that bacterial clearance is correlated with the presence of recruited Th1 cells in the bladder, vaccination typically evokes both cellular adaptive responses and humoral responses. Therefore, how much of the bacterial clearance could be strictly ascribed to Th1 responses was examined. WT and $IFN\gamma^{-/-}$ (which are deficient in Th1 responses) mice were intravesically vaccinated with the vaccine formulation composed of either PBS or UPEC lysate plus CpG as before. After bacterial challenge, bacterial loads in the bladders of the various mouse groups on day 3 were assessed. It was found that in mice immunized with PBS, bacterial clearance in $IFN\gamma^{-/-}$ mice was comparable to that seen in WT mice. However, in mice immunized with UPEC lysate and CpG, bacterial clearance in WT mice were markedly more efficacious compared with $IFN\gamma^{-/-}$ mutant mice (FIG. 2A). At the same time, serum levels of UPEC J96-specific IgG were examined in all of the immunized mice groups and it was found that the degree of enhancement of UPEC-specific IgG levels seen in $IFN\gamma^{-/-}$ mice were comparable to the one observed in WT mice (FIG. 2B). Together, their IgG levels were significantly higher than the minimal levels seen in the two groups of PBS-immunized mice (FIG. 2B). Thus, clearance of bacteria in the two groups of immunized mice correlated with the bladder Th1 response rather than with the circulating IgG response.

Figure 8A:
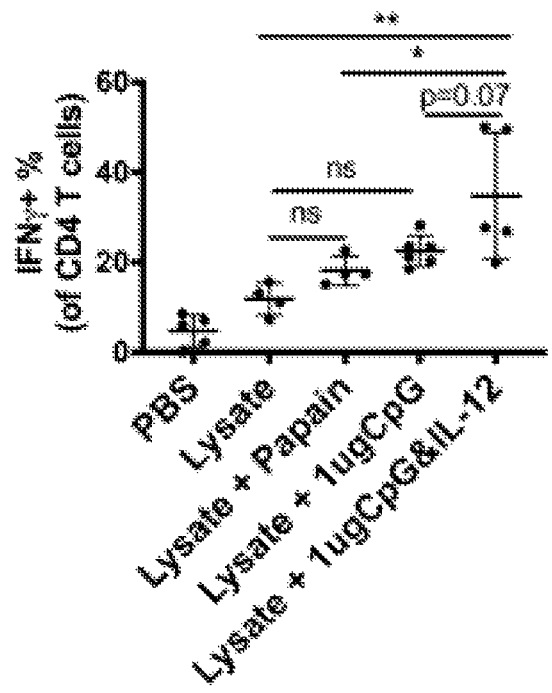
FIG. 8A shows data for naïve Great mice that were intravesically vaccinated with UPEC J96 lysates combined with 10 µg Papain, 1 µg CpG, or 1 µg CpG and 10 µg IL-12 (to make sure the total amount of adjuvant used is round 10 µg in this group) three times. PBS or UPEC J96 lysates alone treated mice served as controls. Then these mice were challenged with UPEC J96. Bladders were collected for flow cytometry analysis on day 3 post challenge. Please note that the data of UPEC lysates+1 µg CpG are the same from FIGS. 1A-B.
Figure 8B:
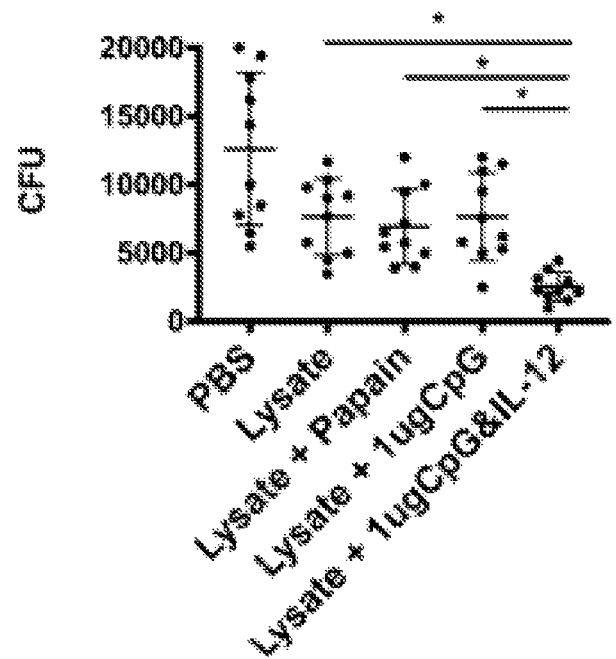
FIG. 8B shows data from naïve WT mice that were intravesically vaccinated with UPEC J96 lysates with 10 µg Papain, 1 µg CpG, or 1 µg CpG and 10 µg IL-12 three times. PBS or J96 lysate alone treated mice were controls. Then all mice were challenged with UPEC J96 and bacterial load determined on day 3.

To further support the notion that specifically boosting bladder Th1 responses is an effective strategy for bladder bacterial clearance, whether combining two distinct type 1 polarizing adjuvants in the vaccination formulation would evoke more enhanced bacterial clearance compared with the use of just a single adjuvant, CpG, were examined. The Th1 reporter Great mice were vaccinated with bacterial lysate along with CpG or a combination of CpG and interleukin (IL)-12, another widely used Th1-skewing adjuvant. PBS-vaccinated and bacteria lysate-alone-vaccinated Great mice were used as negative controls. As an additional comparison, Great mice vaccinated with bacterial lysate combined with papain, a notable Th2-skewing adjuvant, were included. Thereafter, all the immunized mouse groups were challenged with UPEC J96, and their respective Th1 responses and bacteria burden was quantitated 3 d later. It was found that Great mice vaccinated with bacteria lysate and a combination of CpG and IL-12 evoked higher levels of both Th1 responses and bacterial clearance compared with mice vaccinated with CpG only (FIG. 8A-B). Interestingly, immunization of Great mice with bacterial lysate and the Th2-skewing adjuvant papain failed to evoke any significant changes to either Th1 responses or bacterial clearance compared with mice immunized with bacterial lysates alone (FIG. 8A-B).

Figure 8C:
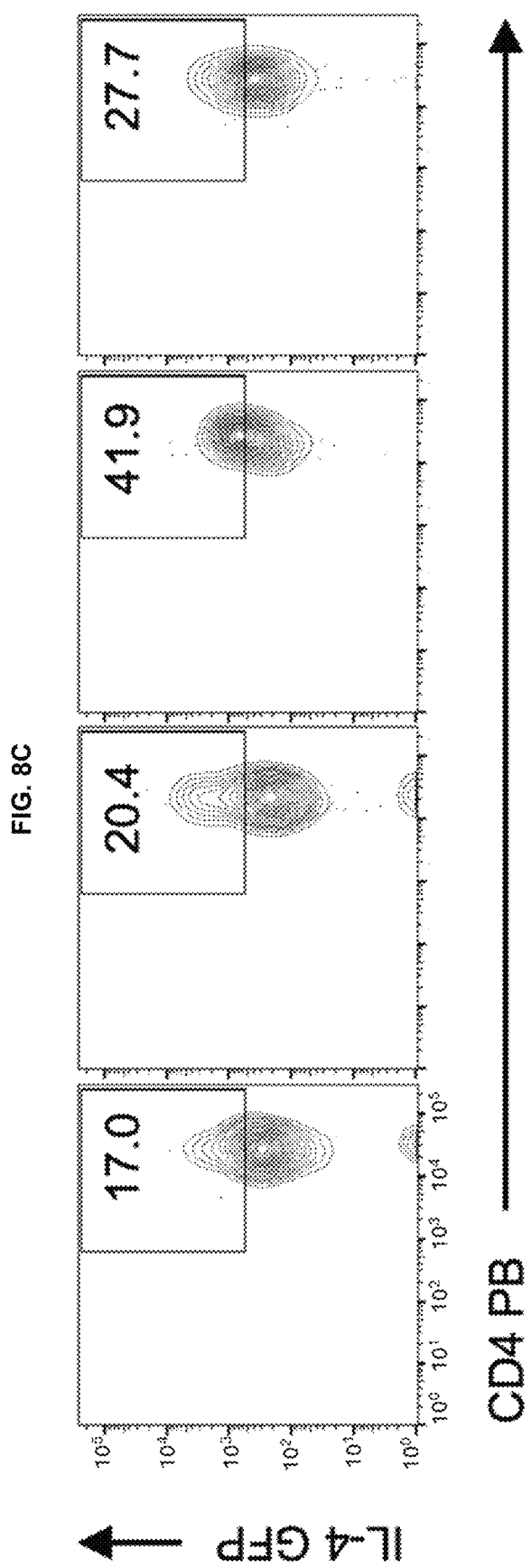
FIG. 8C and FIG. 8D show data from naïve 4get mice that were intravesically vaccinated with UPECJ96 lysate with Papain or CpG & IL-12 three times. PBS or J96 lysate alone treated mice served as controls. There after these mice were challenged with UPECJ96. Bladders were collected for flow cytometry analysis on day 3 post challenge. Each data point represents one mouse, data are shown as mean±SD. Data were analyzed by an ordinary one-way ANOVA with the Tukey's multiple comparison post-hoc test. *p<0.05, **p<0.01, "ns"=not significant.
Figure 8D:
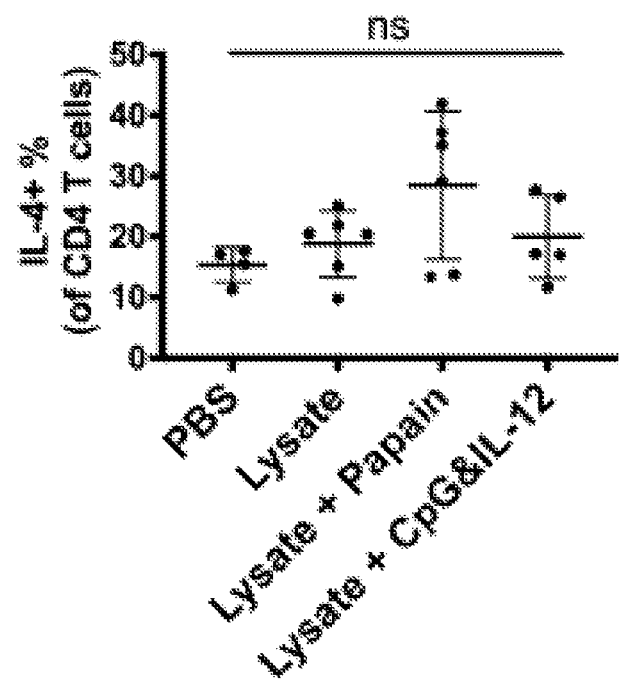

Since Th1 and Th2 responses have been reported to mutually inhibit each other, whether vaccination using type 1 polarizing adjuvants would impair valuable Th2 responses during bladder infection was investigated. Th2 responses in IL-4 reporter (4get) mice, in which the IRES-enhanced green fluorescent protein (eGFP) sequence was tagged at the 3' end of endogenous Il4 gene, the prototype Th2 marker, were examined following vaccination and bacterial challenge. Although not statistically significant, it was found that 4get mice vaccinated with UPEC J96 lysate coadministered with papain trended toward evoking an enhanced Th2 response (FIG. 8C-D). Interestingly, when 4get mice were immunized with bacterial lysate and the adjuvant combination of CpG and IL-12, they showed no reduction in Th2 responses compared with mice vaccinated with PBS or with lysate alone (FIG. 8C-D). Of note, naïve mice can harbor large numbers of memory Th2 cells primed by microbiota that cross-react with UPEC. Conceivably, vaccination with the adjuvant combination CpG and IL-12 promotes induction of new bladder Th1 cells from naïve CD4 T cells but does not eliminate already present memory Th2 cells.

Figure 2C:
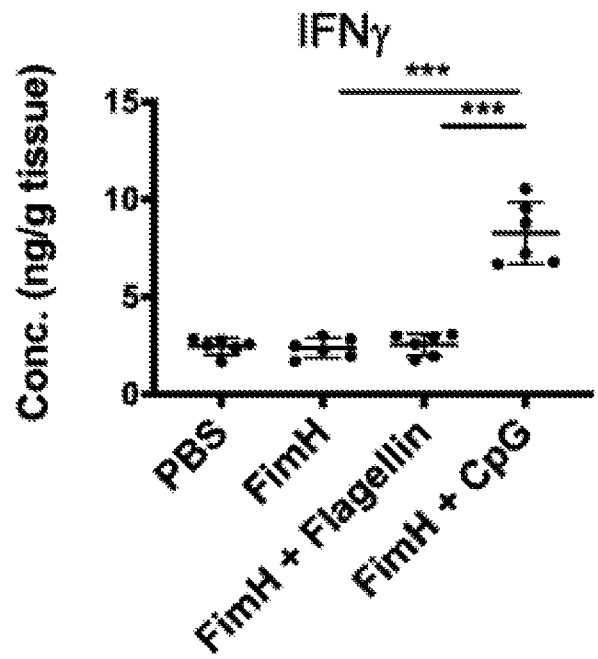
FIG. 2C shows data for naïve WT mice that were intravesically vaccinated three times with FimH combined with 10 µg of flagellin or 10 µg of CpG. Mice treated with PBS or FimH alone served as controls. Then all mice were challenged with UPEC J96. The concentration of IFNγ in bladder lysates was measured on day 3 post challenge by ELISA.
Figure 2D:
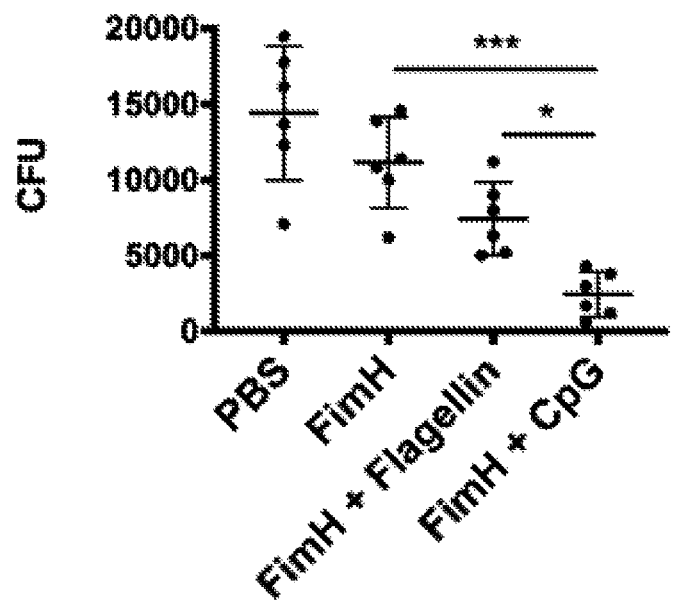
FIG. 2D shows naïve WT mice that were intravesically vaccinated three times with FimH with 10 µg of flagellin or 10 µg of CpG. Mice treated with PBS or FimH alone served as controls. Then all mice were challenged with UPEC J96. Bladders were collected to determine bacterial load on day 3 post challenge.
Figure 2E:
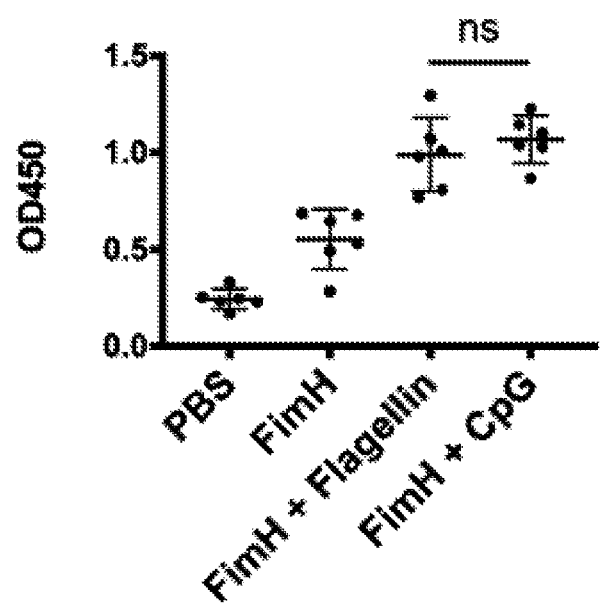
FIG. 2E shows serum from FIG. 2D that was collected to determine the concentration of FimH-specific IgG by ELISA. Each data point represents one mouse. Data are shown as mean±SD. Data were analyzed by an ordinary two-way ANOVA (FIG. 2A and FIG. 2B) or one-way ANOVA (FIGS. C-E) with Tukey's multiple comparison post hoc test. *$P<0.05$; $P<0.01$; *$P<0.001$. "ns," not significant.

Next, the strategy of intravesical vaccination using Th1-polarizing adjuvants by switching vaccine antigens from a mixture of UPEC antigens to a single antigen, FimH, a widely studied UPEC vaccine antigen, was validated. Since some previous studies used FimH as a vaccine antigen used flagellin as the adjuvant, flagellin was included as a separate adjuvant in these comparative studies. Unlike the adjuvants that were used previously herein, flagellin is capable of evoking balanced Th1 and Th2 responses. Groups of WT mice were intravesically vaccinated with PBS, FimH alone, FimH with flagellin, or FimH with CpG on days 0, 7, and 14. Then all the mice were challenged with UPEC J96. At 3 d after the challenge, bladder lysates were examined for IFNγ levels and bacteria burden. It was found that of all the vaccines, only the formulation composed of FimH and CpG evoked enhanced IFNγ levels in the bladder and maximum clearance of bacterial load (FIG. 2C-D). Of note, mice immunized with FimH and CpG evoked comparable levels of circulating FimH-specific IgG as the FimH vaccine coadministered with flagellin (FIG. 2E). Taken together, the Th1, but not the Th2, responses to vaccines are effective in bladder bacterial clearance. Furthermore, Th1-polarizing adjuvants are still effective even when administered with a single UPEC vaccine antigen.

Example 4

Figure 3A:
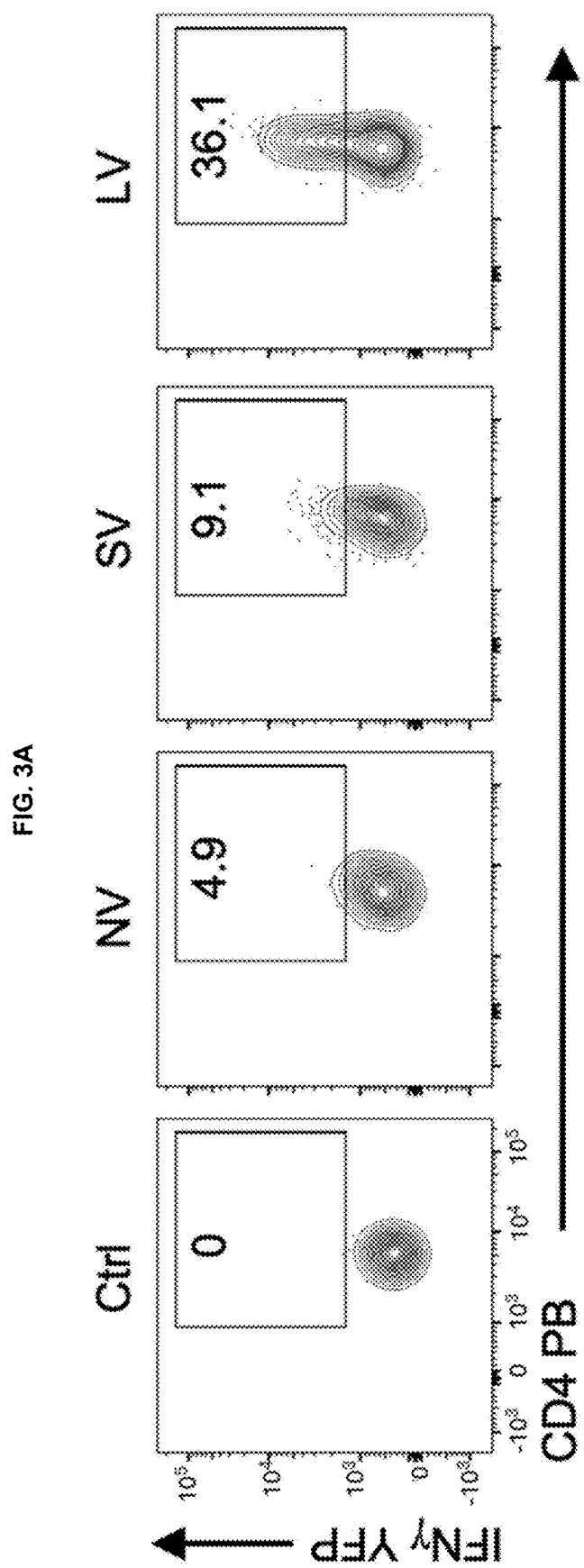
FIG. 3A and FIG. 3B show data from naïve Great mice that were intravesically vaccinated (LV) or subcutaneously vaccinated (SV) three times with FimH and 10 µg of CpG, then challenged with UPEC J96. Unvaccinated naïve Great mice (NV) were also challenged with UPEC J96 as a control. Bladders and spleens were collected for flow cytometry analysis on day 3 post challenge. WT C57BL/6J mice infected with J96 served as controls for YFP gating.
Figure 3B:
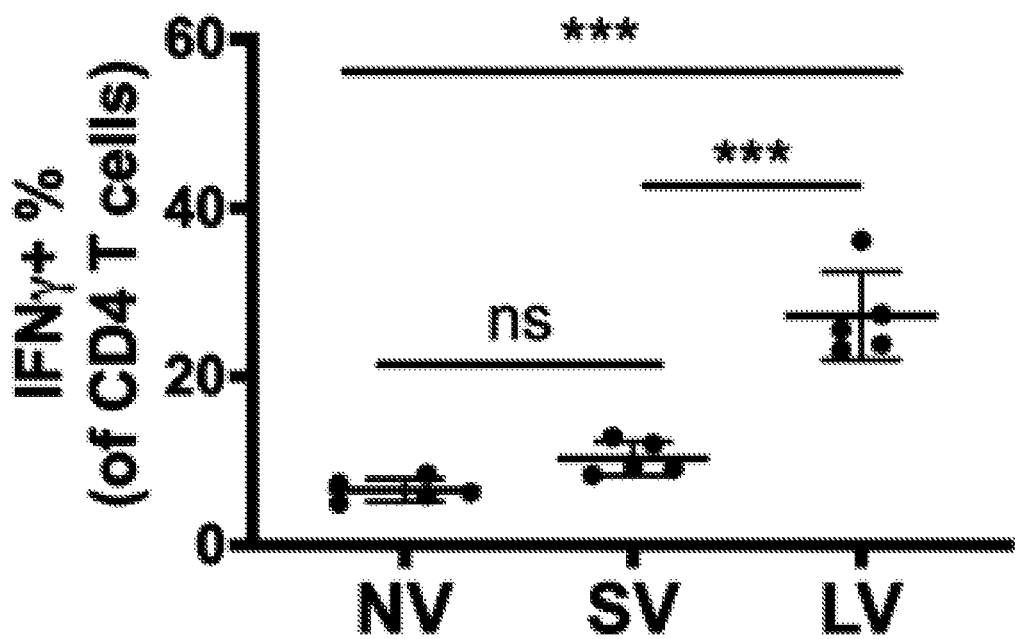
Figure 3C:
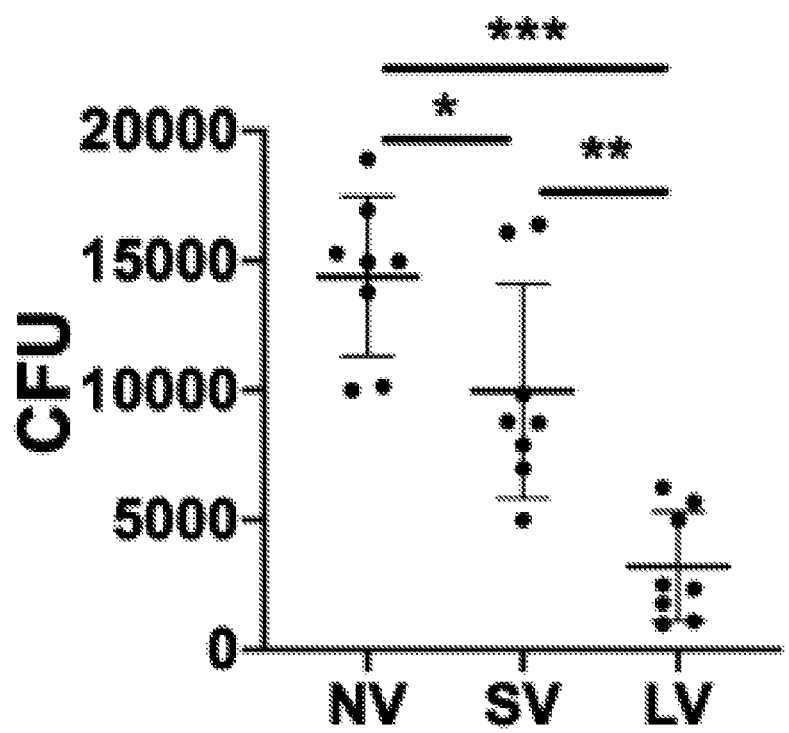
FIG. 3C shows data from naïve WT mice that were LV or SV three times with FimH and 10 µg of CpG, then challenged with UPEC J96. Unvaccinated naïve WT mice (NV) were also challenged with UPEC J96 as a control. Bladders were collected to determine bacterial load on day 3 post challenge. Each data point represents one mouse. Data are shown as mean±SD. Data were analyzed by ordinary one-way ANOVA with Tukey's multiple comparison post hoc test. *P<0.05; P<0.01; *P<0.001. "ns," not significant.

Bladder Vaccination Induces Stronger Th1 Responses and Superior Bacterial Clearance Compared With Subcutaneous Vaccination For the aforementioned studies herein, a bladder vaccination strategy was used rather than a conventional route of vaccination, because Applicant believed that local vaccination would be more effective in inducing strong Th1 responses in the bladder. To validate this notion, bladder Th1 responses were compared to a vaccine composed of FimH and CpG in Great mice following local vaccination (LV) or subcutaneous vaccination (SV), a common route of UTI vaccine administration. It was observed that LV mice evoked a significantly stronger bladder Th1 response than either SV or control unvaccinated (NV) Great mice (FIG. 3A-B). Whether LV also induces better bacteria clearance than SV was investigated by comparing bladder bacterial loads in the above three groups of WT mice following vaccination and bacterial challenge. It was found that the bacterial loads were significantly lower in SV and LV mice than in control NV mice, but, more importantly, the bacterial load was markedly lower in LV mice than in SV mice (FIG. 3C). Thus, although both vaccination routes conferred protection, local immunization evoked greater numbers of Th1 cells in the bladder and was markedly more protective against bladder infection than the common subcutaneous route of immunization.

Example 5

Vaccination with CpG can Induce Protective Th1 Responses Even in Mice Heavily Programmed to Evoke a Strong Th2 Response Recent studies have revealed that mice subjected to multiple UTIs are heavily programmed to evoke a powerful Th2 response with limited capacity to clear infections. This condition is closely reminiscent of subjects prone to recurrent UTIs, in whom each infectious bout predisposes to another infection. All of the above studies herein demonstrating the efficacy of Th1-polarizing vaccine were undertaken in naïve mice. However, in view of the fact that the subpopulation most likely to receive a UTI vaccine is individuals with a history of recurrent UTIs, whether the vaccine formulation described herein would be efficacious in mice whose immune system has already been polarized toward a strong Th2 response was investigated.

Figure 4A:
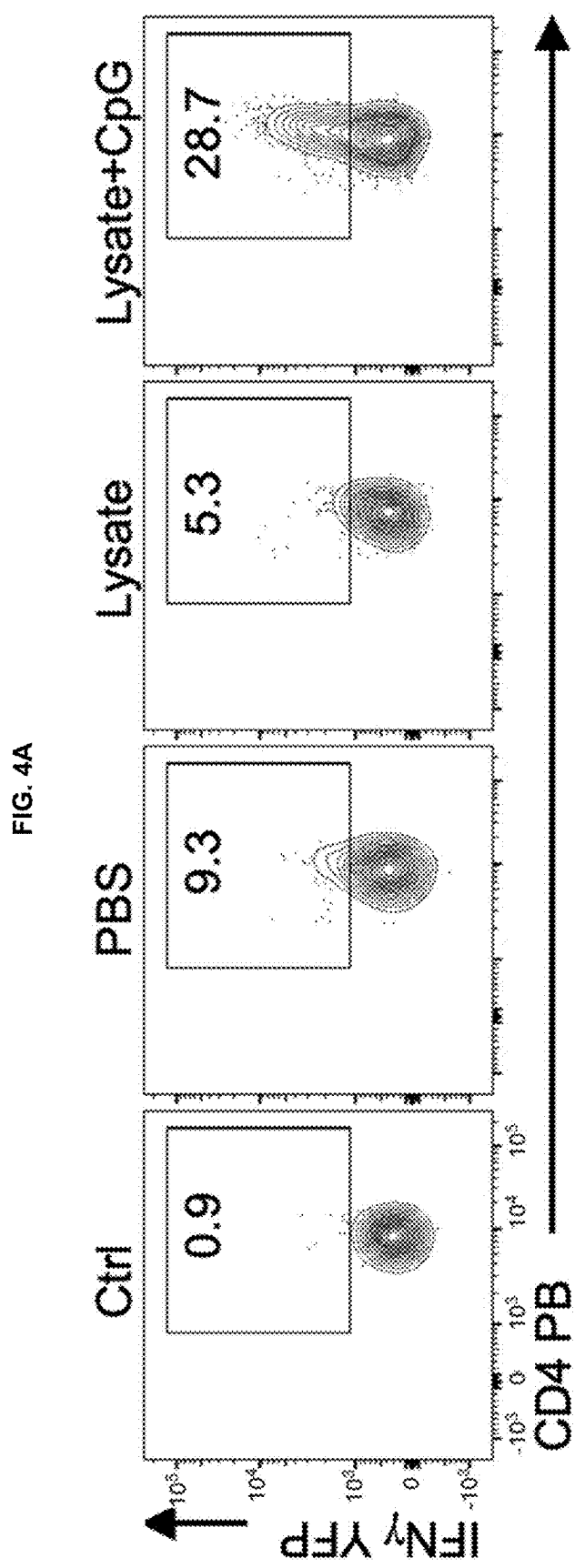
FIG. 4A and FIG. 4B show data for naïve Great mice that were intravesically infected by UPEC J96 three times, then vaccinated three times with PBS, UPEC J96 lysates alone, or UPEC J96 lysates with 10 µg of CpG. These immunized mice were then challenged once again with UPEC J96. Bladders were collected for flow cytometry analysis on day 3 post challenge. WT C57BL/6J mice infected with UPEC J96 served as controls for YFP gating.
Figure 4B:
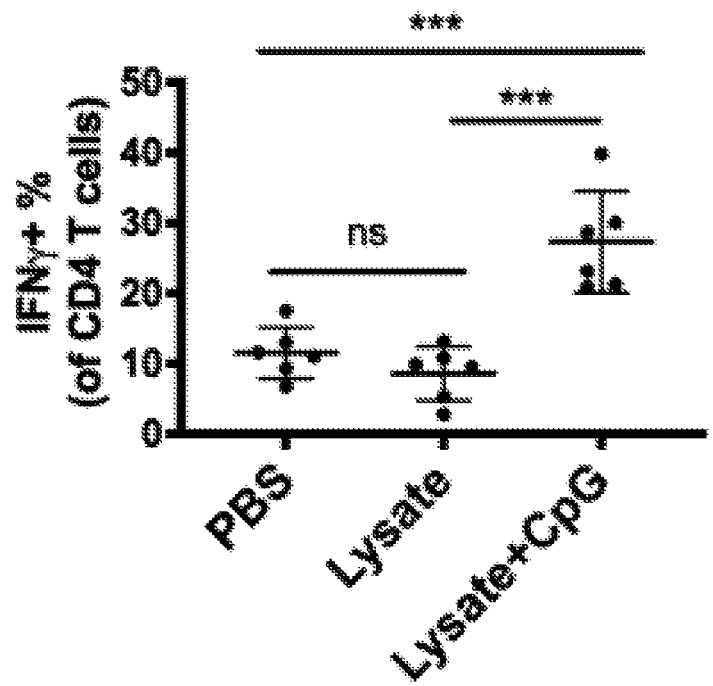
Figure 4C:
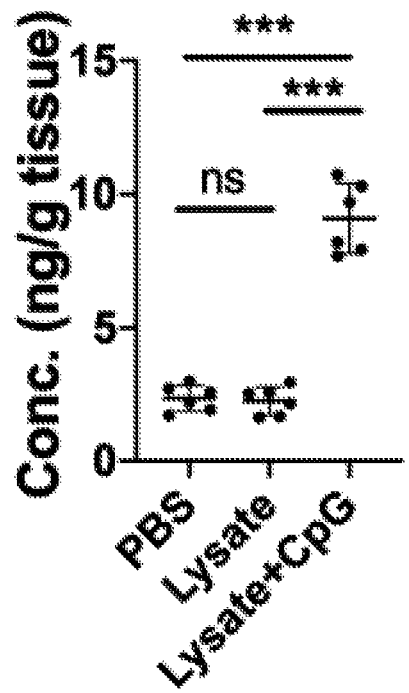
FIG. 4C shows data for naïve WT mice that were intravesically infected with UPEC J96 three times, then vaccinated three times with PBS, UPEC J96 lysates alone, or UPEC J96 lysates with 10 µg of CpG. These mice were once again challenged with UPEC J96. The concentration of IFNγ in bladder lysates was measured on day 3 post challenge by ELISA.
Figure 4D:
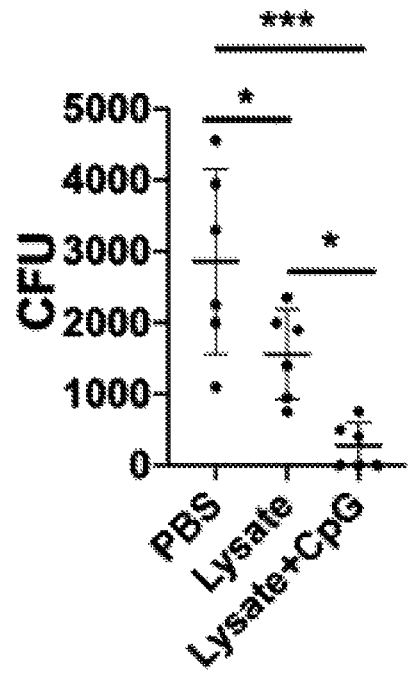
FIG. 4D shows data for naïve WT mice were intravesically infected with UPEC J96 three times, then vaccinated three times with PBS, UPEC J96 lysates alone, or UPEC J96 lysates with 10 µg of CpG. These mice were once again challenged with UPEC J96. Bladders were collected to determine bacterial load on day 3 post challenge.
Figure 4E:
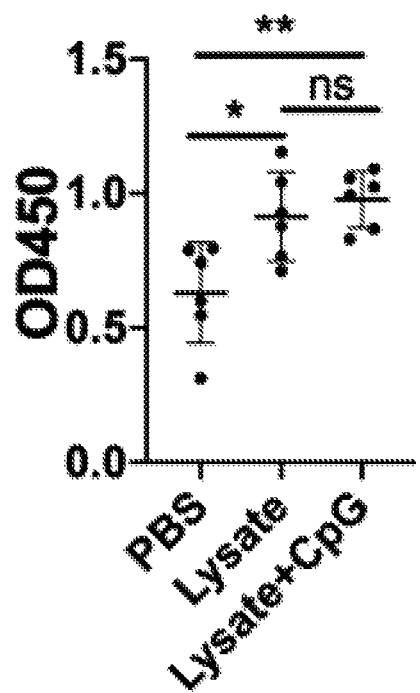
FIG. 4E shows serum from FIG. 4D that was collected to determine the concentration of UPEC J96-specific IgG by ELISA.

Applicant previously established that mice subjected to three consecutive UTIs exhibited Th2 immune responses and symptoms typically associated with patients prone to recurrent UTIs, including impaired bladder function and the inability to totally clear bladder bacteria (Wu J., et al., Nat. Immunol. 21, 671-683 (2020)). To test whether immunization of this population of mice will enhance their capacity to clear challenge bacteria, Great mice were subjected to three consecutive UTIs and then vaccinated as before, with PBS, UPEC lysate alone, or lysate with CpG. Thereafter, the mice were challenged by UPEC J96 infection. At 3 d after the challenge, the bladder immune cells were examined using flow cytometry. Thrice-infected WT C57BL/6J mice were used as a negative control for YFP gating. It was found that Great mice vaccinated with bacterial lysates and CpG exhibited a markedly enhanced Th1 response compared with the PBS group or bacterial lysate-alone group (FIG. 4A-B). Next, this study was repeated in WT C57BL/6J mice and then sought to assess the corresponding IFNγ levels and bacterial loads in bladder lysates. The results were consistent with those obtained from Great mice, showing that mice vaccinated with UPEC J96 lysate along with CpG had significantly higher IFNγ levels and were better able to clear bacteria compared with mice vaccinated with PBS vaccination or with lysate alone (FIG. 4C-D). The levels of UPEC-specific IgG were also measured in the serum of these mice and it was found that the CpG did not further enhance IgG production compared with repeatedly infected mice with lysate-alone vaccination (FIG. 4E). Above in the studies herein, it was found that bladder bacterial clearance was improved on day 14 post-infection compared with day 3 (FIG. 1D). Here it was examined if given more time, enhanced bacterial clearance could be achieved in multiple infected mice following immunization. Although both mice immunized with UPEC lysate alone or lysate with CpG harbored a significantly reduced bacterial load compared with PBS immunized mice on day 14, up to 80% of mice immunized with bacterial lysate and CpG were totally cleared of bladder bacteria (FIG. 4F). Thus, intravesical vaccination with a Th1-polarizing adjuvant has the potential to promote complete bacterial clearance in UTI-prone bladders.

Example 6

Administration of UTI Vaccine into the Bladder Wall as an Alterative to Intraluminal Vaccination In the studies described above, it was found that introducing a UTI vaccine (*E. coli* antigens+CpG) intraluminally via a catheter into the mouse bladder was a highly efficacious route of vaccination. This route of vaccination not only ensures a high systemic antibody response but also, specific recruitment of significant amounts of *E. coli* specific T cells into the bladder to clear recalcitrant *E. coli*. Directly vaccinating the bladder is a key distinction of the vaccination strategy described herein over other UTI vaccine strategies. This vaccine strategy informs the immune system to direct its response primarily to the bladder, which is not the case for other previously described UTI vaccines which have so far proven largely ineffective. While intraluminal vaccine administration into the mouse bladder is readily feasible, it may be less so in humans where at least 20 mL of vaccine per patient would be required to adequately stimulate the bladder's immune system.

Figure 9:
FIG. 9 shows an exposed mouse bladder where the wall was injected at two distinct sites with trypan blue dye.

To overcome this potential limitation, an alternate route of bladder vaccination was employed where small amounts and volumes of vaccine antigen was utilized. A novel route for human bladder vaccination is intramuscular injection into the bladder wall. This is analogous to how BOTOX® (botulinum toxin) injections are deployed via cystoscopy into the bladder wall for the treatment of overactive bladder and urinary incontinence (FDA, Botox (onabotulinumtoxina) for injection, for intramuscular). The immune responses (serologic and T cell responses) evoked by intramuscular vaccine administration of small amounts of vaccine antigen in the bladder wall were identical to that evoked following intraluminal deployment of larger volumes/amounts of antigen as the lymph nodes that drains both of these sites remain the same iliac lymph nodes. To support this notion whether bladder wall vaccination will result in an efficacious antibody response was examined. Unlike in humans where the bladder wall can be readily vaccinated using a cystoscope, bladder immunization in mice requires a delicate microsurgical technique. Briefly, two groups of mice were placed under inhaled isoflurane anesthesia (2-5% for induction, 1-3% for maintenance) and the bladder exposed by making a midline abdominal incision. After the bladder was emptied of urine from the first group of mice, two injections, each comprising 10 µl of fluid containing $1\times10^5$ heat killed *E. coli* lysates and 10 µg of CpG was intramurally injected into the wall of the bladder dome using a Hamilton syringe. The second group was vaccinated as the first group, except vector alone was employed. The wounds in each of the mice were then closed using biodegradable sutures and the mice were allowed to recover on a warming pad and left undisturbed until the booster dose was applied. In FIG. 9, a mouse bladder injected at two distinct sites with a total of 20 µl of Trypan blue dye showing the localization of the injected material strictly within the bladder wall is shown.

Figure 10:
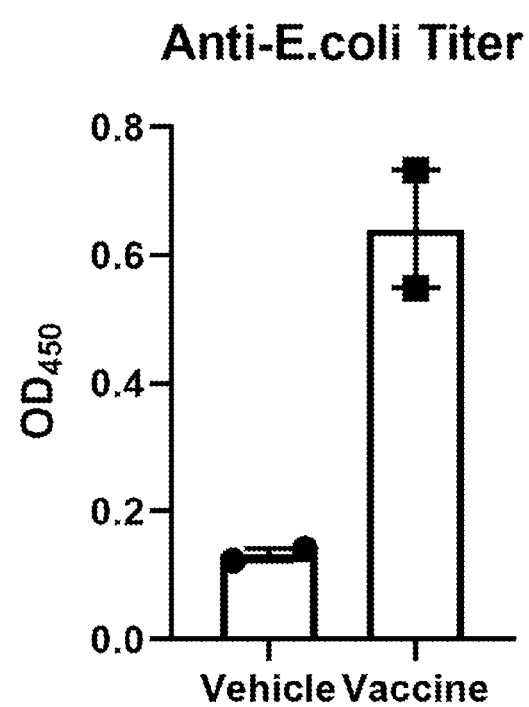
FIG. 10 shows elevated anti-*E. coli* antibodies evoked in mice following intramuscular vaccination with *E. coli* lysate+CpG.

The two groups of mice were then vaccinated two more times, in 2 week intervals, and a week after the final vaccination. Blood from both groups of mice were collected and assessed for *E. coli* specific antibodies. It was found that intramuscular bladder vaccination with *E. coli*+CpG evoked an enhanced IgG antibody response compared to vector immunized mice (FIG. 10), indicating that this route of vaccination was efficacious in evoking antigen specific immune responses.

Recently, Applicant obtained a patent for the efficacious delivery of vaccines and immunodulators following intramuscular vaccination to the epicenter of the adaptive immune response, namely the draining lymph nodes by packaging the vaccine formulation with biodegradative nanoparticles, U.S. Pat. No. 10,245,319, which is incorporated in its entirety herein by reference. The vaccine formulations as described herein (e.g., *E. coli* FimH+CpG) may be packaged in these nanoparticles to maximize bladder immune responses by conferring long term protection against recurrent UTIs.

Example 7

Truncated FimH

Figure 11:
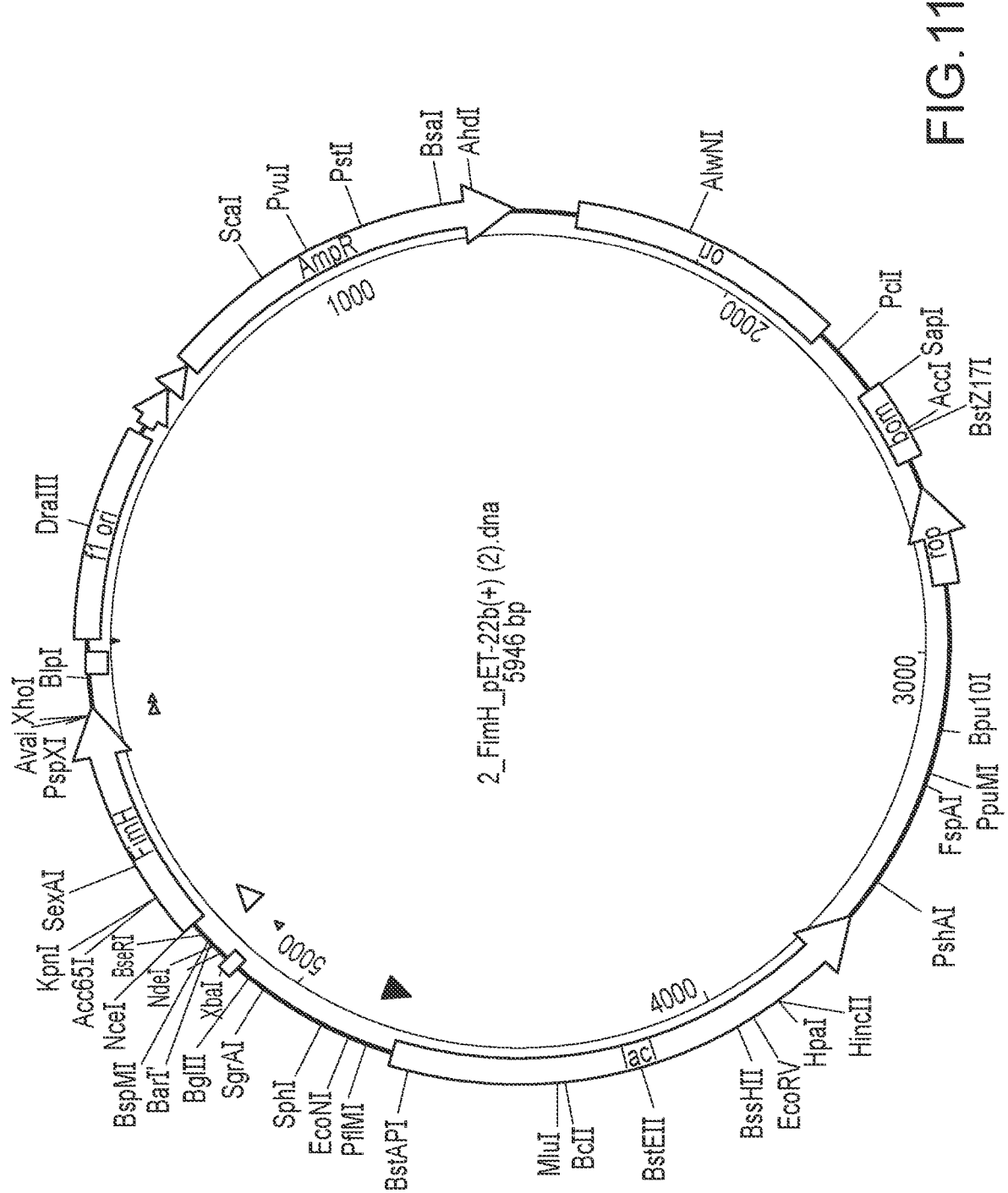
FIG. 11 shows the plasmid encoding a FimH fragment that still retains most of the functional and antigenic properties of the full length FimH protein.

The initial studies described above employed full length FimH as the vaccine antigen. However, herein the functionally relevant region of FimH was localized and it was determined that most of the activity resides in the first 163 amino acids of the FimH protein. Therefore, this gene fragment was subcloned and the resulting plasmid (FIG. 11) will be used to generate recombinant FimH1-163 for use as the vaccine antigen for future vaccine studies.

The foregoing description of the specific aspects will so fully reveal the general nature of the invention that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

For reasons of completeness, various aspects of the invention are set out in the following numbered clauses:

Clause 1. A recombinant vaccine composition comprising: a truncated fimbrial protein, wherein the truncated fimbrial protein is amino acids 1-163 of FimH; and, an adjuvant that induces and stimulates a T helper cell 1 (Th1) response.

Clause 2. The recombinant vaccine composition of clause 1, wherein the adjuvant is a CpG oligodeoxynucleotide (ODN), monophosphoryl lipid A (MPLA), imiquimod, gardiquimod, R848, nucleotide binding oligomerization domain containing 2 (NOD2) ligands, IL-12, or a combination thereof.

Clause 3. The recombinant vaccine composition of clause 2, wherein the CpG ODN is CpG ODN 1826, ODN 2006, ODN 1585, ODN 2216, ODN 2395, ODN BW001, or a combination thereof.

Clause 4. The recombinant vaccine composition of any one of clauses 1-3, wherein the recombinant vaccine composition is incorporated into one or more biodegradable nanoparticles.

Clause 5. The recombinant vaccine composition of clause 4, wherein the one or more biodegradable nanoparticles comprise heparin and chitosan.

Clause 6. The recombinant vaccine composition of any one of clauses 1-5, wherein a ratio of the truncated fimbrial protein to the adjuvant is from about 10:1 to about 1:10.

Clause 7. The recombinant vaccine composition of any one of clauses 1-6, wherein the recombinant vaccine composition further comprises pharmaceutically acceptable carriers, excipients, or diluents.

Clause 8. The recombinant vaccine composition of clause 7, wherein the pharmaceutically acceptable carrier comprises liposomes.

Clause 9. The recombinant vaccine composition of any one of clauses 1-8, wherein the recombinant vaccine composition further comprises one or more protein products capable of evoking protective immunity produced by a bacterium that causes a urinary tract infection (UTI).

Clause 10. A method of treating or preventing a urinary tract infection (UTI) in a subject comprising administering to the subject a recombinant vaccine composition comprising: a truncated fimbrial protein, wherein the truncated fimbrial protein is amino acids 1-163 of FimH; and, an adjuvant that induces and stimulates a T helper cell 1 (Th1) response; wherein the recombinant vaccine composition is administered locally to the bladder of the subject.

Clause 11. The method of clause 10, wherein the recombinant vaccine composition is administered by intramuscular injection into the bladder wall of the subject or intraluminal administration into the bladder of the subject.

Clause 12. The method of clause 11, wherein about 0.01 mg/kg to about 100 mg/kg of the recombinant vaccine composition is administered by intramuscular injection into the bladder wall of the subject.

Clause 13. The method of clause 11, wherein about 0.0001 mg/kg to about 100 mg/kg of the recombinant vaccine composition is administered by intraluminal administration into the bladder of the subject.

Clause 14. The method of any one of clauses 10-13, wherein the recombinant vaccine composition is initially administered from about 2 to about 4 times; wherein each vaccine is administered about 1 month apart.

Clause 15. The method of clause 14, wherein a booster dose of the recombinant vaccine composition is administered about 6 months to about 12 months after the initial administration of the recombinant vaccine composition.

Clause 16. The method of any one of clauses 10-15, wherein the adjuvant is a CpG oligodeoxynucleotide (ODN), monophosphoryl lipid A (MPLA), imiquimod, gardiquimod, R848, nucleotide binding oligomerization domain containing 2 (NOD2) ligands, IL-12, or a combination thereof.

Clause 17. The method of clause 16, wherein the CpG ODN is CpG ODN 1826, ODN 2006, ODN 1585, ODN 2216, ODN 2395, ODN BW001, or a combination thereof.

Clause 18. The method of any one of clauses 10-17, wherein the recombinant vaccine composition is incorporated into one or more biodegradable nanoparticles.

Clause 19. The method of clause 18, wherein the biodegradable nanoparticles comprise heparin and chitosan.

Clause 20. The method of any one of clauses 10-19, wherein a ratio of the truncated fimbrial protein to the adjuvant is from about 10:1 to about 1:10.

Clause 21. The method of any one of clauses 10-20, wherein the recombinant vaccine composition further comprises one or more protein products capable of evoking protective immunity produced by a bacterium that causes UTIs.

Clause 22. The method of any one of clauses 10-21, wherein the UTI is caused by an enterobacteria that expresses FimH.

Clause 23. The method of clause 22, wherein the enterobacteria is one or more of *Escherichia coli* (*E. coli*), *Klebsiella pneumoniae* (*Klebsiella* spp.), *Citrobacter freundii* (*Citrobacter* spp.), and *Serratia marcescens* (*Serratia* spp.).

Clause 24. A method of preparing a recombinant vaccine composition comprising the steps of: (a) providing a truncated fimbrial protein, wherein the truncated fimbrial protein is amino acids 1-163 of FimH; and (b) combining the truncated fimbrial protein with an adjuvant that induces and stimulates a T helper cell 1 (Th1) response.

Clause 25. The method of clause 24, wherein the step of providing the truncated fimbrial protein comprises: i. subcloning a polynucleotide encoding the truncated fimbrial protein into a plasmid; ii. introducing the polynucleotide into a cell; iii. expressing the truncated fimbrial protein in the cell; and iv. purifying the truncated fimbrial protein from the cell.

Clause 26. The method of clause 25, wherein the polynucleotide sequence is SEQ ID NO: 3.

Clause 27. The method of clause 25, wherein the cell is a mammalian cell, a bacterial cell, or a cell line.

Clause 28. The method of any one of clauses 24-27, wherein the adjuvant is a CpG oligodeoxynucleotide (ODN), monophosphoryl lipid A (MPLA), imiquimod, gardiquimod, R848, nucleotide binding oligomerization domain containing 2 (NOD2) ligands, IL-12, or a combination thereof.

Clause 29. The method of clause 28, wherein the CpG ODN is CpG ODN 1826, ODN 2006, ODN 1585, ODN 2216, ODN 2395, ODN BW001, or a combination thereof.

Clause 30. The method of any one of clauses 24-29, wherein the method further comprises incorporating the recombinant vaccine composition into one or more biodegradable nanoparticles.

Clause 31. The method of clause 30, wherein the one or more nanoparticles comprise heparin and chitosan.

Clause 32. The method of any one of clauses 24-31, wherein a ratio of the truncated fimbrial protein to the adjuvant is from about 10:1 to about 1:10.

Clause 33. The method of any one of clauses 24-32, wherein the method further comprises adding pharmaceutically acceptable carriers, excipients, or diluents to the recombinant vaccine composition.

Clause 34. The method of any one of clauses 24-33, wherein the method further comprises combining the truncated fimbrial protein and the adjuvant with one or more protein products capable of evoking protective immunity produced by a bacterium that causes a urinary tract infection (UTI).

```
SEQUENCES
FimH DNA sequence
                                                   SEQ ID NO: 1
atgaaacgagttattaccctgtttgctgtactgctgatgggctggtcggtaaatgcctggtcat tcgcctgtaaaaccgccaatggtacagctatccctattggcggtggcagcgctaatgtttatgt aaaccttgcgccgccgtgaatgtggggcaaaacctggtcgtagatctttcgacgcaaatctttt tgccataacgattatccggaaaccattacagactatgtcacactgcaacgaggctcggcttatg gcggcgtgttatctaattttccgggaccgtaaaatatagtggcagtagctatccatttcctac caccagcgaaacgccgcgcgttgtttataattcgagaacggataagccgtggccggtggcgctt tatttgacgcctgtgagcagtgcgggcggggtggcgattaaagctggctcattaattgccgtgc ttattttgcgacagaccaacaactataacagcgatgatttccagtttgtgtggaatatttacgc caataatgatgtggtggtgcccactggcggctgtgatgtttctgctcgtgatgtcaccgttact ctgccggactaccctggttcagtgccaattcctcttaccgtttattgtgcgaaaagccaaaacc tggggtattacctctccggcacaaccgcagatgcgggcaactcgattttcaccaataccgcgtc gttttcaccagcgcagggcgtcggcgtacagttgacgcgcaacggtacgattattccagcgaat aacacggtatcgttaggagcagtaggaacttcggcggtaagtctgggattaacggcaaattacg cacgtaccggagggcaggtgactgcagggaatgtgaaatcgattattggcgtgacttttgttta tcaataa FimH amino acid sequence
                                                   SEQ ID NO: 2
MKRVITLFAVLLMGWSVNAWSFACKTANGTAIPIGGGSANVYVNLAPVVNVGQNLVVDLSTQIF

CHNDYPETITDYVTLORGSAYGGVLSNFSGTVKYSGSSYPFPTTSETPRVVYNSRTDKPWPVAL

YLTPVSSAGGVAIKAGSLIAVLILRQTNNYNSDDFQFVWNIYANNDVVVPTGGCDVSARDVTVT

LPDYPGSVPIPLTVYCAKSQNLGYYLSGTTADAGNSIFINTASFSPAQGVGVOLTRNGTIIPAN

NTVSLGAVGTSAVSLGLTANYARTGGQVTAGNVQSIIGVTFVYQ

FimH1-163 fragment DNA sequence
                                                   SEQ ID NO: 3
atggccatgaaacgagttattaccctgtttgctgtactgctgatgggctggtcggtaaatgcct ggtcattcgcctgtaaaaccgccaatggtaccgctatccctattggcggtggcagcgccaatgt ttatgtaaaccttgcgccgtcgtgaatgtggggcaaaacctggtcgtggatctttcgacgcaa atcttttgccataacgattatccggaaaccattacagactatgtcacactgcaacgaggctcgg cttatggcggcgtgttatctaattttccgggaccgtaaaatatagtggcagtagctatccatt tcctaccaccagcgaaacgccgcgcgttgtttataattcgagaacggataagccgtggccggtg gcgctttatttgacgcctgtgagcagtgcgggcggggtggcgattaaagctggctcattaattg ccgtgcttattttgcgacagaccaacaactataacagcgatctggaagttctgttccaggggcc cctcgag
```

-continued

FimH1-163 fragment amino acid sequence
SEQ ID NO: 4
MKRVITLFAVLLMGWSVNAWSFACKTANGTAIPIGGGSANVYVNLAPVVNVGQNLVVDLSTQIF
CHNDYPETITDYVTLQRGSAYGGVLSNESGTVKYSGSSYPFPTTSETPRVVYNSRTDKPWPVAL
YLTPVSSAGGVAIKAGSLIAVLILRQTNNYNSDDF Insert DNA sequence for plasmid encoding FimH fragment
SEQ ID NO: 5
atgaaatacctgctgccgaccgctgctgctggtctgctgctcctcgctgcccagccggcgatgg
ccatggccatgaaacgagttattaccctgtttgctgtactgctgatgggctggtcggtaaatgc
ctggtcattcgcctgtaaaaccgccaatggtaccgctatccctattggcggtggcagcgccaat
gtttatgtaaaccttgcgcccgtcgtgaatgtggggcaaaacctggtcgtggatctttcgacgc
aaatcttttgccataacgattatccggaaaccattacagactatgtcacactgcaacgaggctc
ggcttatggcggcgtgttatctaattttccgggaccgtaaaatatagtggcagtagctatcca
tttcctaccaccagcgaaacgccgcgcgttgtttataattcgagaacggataagccgtggccgg
tggcgctttatttgacgcctgtgagcagtgcgggcggggtggcgattaaagctggctcattaat
tgccgtgcttattttgcgacagaccaacaactataacagcgatctggaagttctgttccagggg
cccctcgagcaccaccaccaccaccactga PelB leader DNA sequence
SEQ ID NO: 6
atgaaatacctgctgccgaccgctgctgctggtctgctgctcctcgctgcccagccggcgatgg 6X His tag DNA sequence
SEQ ID NO: 7
caccaccaccaccaccac HRV3C protease cut recognition DNA sequence
SEQ ID NO: 8
ctggaagttctgttccaggggccc

---

The invention claimed is:

1. A recombinant vaccine composition comprising:
   a truncated fimbrial protein, wherein the truncated fimbrial protein is SEQ ID NO: 4; and,
   an adjuvant that includes and stimulates a T helper cell 1 (Th1) response.

2. The recombinant vaccine composition of claim 1, wherein the adjuvant is a CpG oligodeoxynucleotide (ODN), monophosphoryl lipid A (MPLA), imiquimod, gardiquimod, R848, nucleotide binding oligomerization domain containing 2 (NOD2) ligands, IL-12, or a combination thereof.

3. The recombinant vaccine composition of claim 2, wherein the CpG ODN is CpG ODN 1826, ODN 2006, ODN 1585, ODN 2216, ODN 2395, ODN BW001, or a combination thereof.

4. The recombinant vaccine composition of claim 1, wherein the recombinant vaccine composition is incorporated into one or more biodegradable nanoparticles, wherein the one or more biodegradable nanoparticles comprise heparin and chitosan.

5. The recombinant vaccine composition of claim 1, wherein a ratio of the truncated fimbrial protein to the adjuvant is from about 10:1 to about 1:10.

6. The recombinant vaccine composition of claim 1, wherein the recombinant vaccine composition further comprises pharmaceutically acceptable carriers, excipients, or diluents.

7. The recombinant vaccine composition of claim 6, wherein the pharmaceutically acceptable carrier comprises liposomes.

8. The recombinant vaccine composition of claim 1, wherein the recombinant vaccine composition further comprises one or more protein products capable of evoking protective immunity produced by a bacterium that causes a urinary tract infection (UTI).

9. A method of treating or preventing a urinary tract infection (UTI) in a subject comprising administering to the subject a recombinant vaccine composition comprising:
   a truncated fimbrial protein, wherein the truncated fimbrial protein is SEQ ID NO: 4; and,
   an adjuvant that includes and stimulates a T helper cell 1 (Th1) response;
   wherein the recombinant vaccine composition is administered locally to the bladder of the subject.

10. The method of claim 9, wherein the recombinant vaccine composition is administered by intramuscular injection into the bladder wall of the subject or intraluminal administration into the bladder of the subject.

11. The method of claim 10, wherein about 0.01 mg/kg to about 100 mg/kg of the recombinant vaccine composition is administered by intramuscular injection into the bladder wall of the subject or wherein about 0.0001 mg/kg to about 100 mg/kg of the recombinant vaccine composition is administered by intraluminal administration into the bladder of the subject.

12. The method of claim 9, wherein the recombinant vaccine composition is initially administered from about 2 to about 4 times;
   wherein each vaccine is administered about 1 month apart.

13. The method of claim 12, wherein a booster dose of the recombinant vaccine composition is administered about 6 months to about 12 months after the initial administration of the recombinant vaccine composition.

14. The method of claim 9, wherein the adjuvant is a CpG oligodeoxynucleotide (ODN), monophosphoryl lipid A (MPLA), imiquimod, gardiquimod, R848, nucleotide binding oligomerization domain containing 2 (NOD2) ligands, IL-12, or a combination thereof.

15. The method of claim 14, wherein the CpG ODN is CpG ODN 1826, ODN 2006, ODN 1585, ODN 2216, ODN 2395, ODN BW001, or a combination thereof.

16. The method of claim 9, wherein the recombinant vaccine composition is incorporated into one or more biodegradable nanoparticles, wherein the biodegradable nanoparticles comprise heparin and chitosan.

17. The method of claim 9, wherein a ratio of the truncated fimbrial protein to the adjuvant is from about 10:1 to about 1:10.

18. The method of claim 9, wherein the recombinant vaccine composition further comprises one or more protein products capable of evoking protective immunity produced by a bacterium that causes UTIs.

19. The method of claim 9, wherein the UTI is caused by an enterobacteria that expresses FimH.

20. The method of claim 19, wherein the enterobacteria is one or more of *Escherichia coli* (*E. coli*), *Klebsiella pneumoniae* (*Klebsiella* spp.), *Citrobacter freundii* (*Citrobacter* spp.), and *Serratia Marcescens* (*Serratia* spp.).

21. A method of preparing a recombinant vaccine composition comprising the steps of:
   (a) providing a truncated fimbrial protein, wherein the truncated fimbrial protein is SEQ ID NO: 4; and
   (b) combining the truncated fimbrial protein with an adjuvant that induces and stimulates a T helper cell 1 (Th1) response.

22. The method of claim 21, wherein the step of providing the truncated fimbrial protein comprises:
   i. subcloning a polynucleotide encoding the truncated fimbrial protein into a plasmid;
   ii. introducing the polynucleotide into a cell;
   iii. expressing the truncated fimbrial protein in the cell; and
   iv. purifying the truncated fimbrial protein from the cell.

23. The method of claim 22, wherein the polynucleotide sequence is SEQ ID NO: 3.

24. The method of claim 21, wherein the adjuvant is a CpG oligodeoxynucleotide (ODN), monophosphoryl lipid A (MPLA), imiquimod, gardiquimod, R848, nucleotide binding oligomerization domain containing 2 (NOD2) ligands, IL-12, or a combination thereof.

25. The method of claim 24, wherein the CpG ODN is CpG ODN 1826, ODN 2006, ODN 1585, ODN 2216, ODN 2395, ODN BW001, or a combination thereof.

26. The method of claim 21, wherein the method further comprises incorporating the recombinant vaccine composition into one or more biodegradable nanoparticles, wherein the one or more nanoparticles comprise heparin and chitosan.

27. The method of claim 21, wherein a ratio of the truncated fimbrial protein to the adjuvant is from about 10:1 to about 1:10.

28. The method of claim 21, wherein the method further comprises adding pharmaceutically acceptable carriers, excipients, or diluents to the recombinant vaccine composition.

29. The method of claim 21, wherein the method further comprises combining the truncated fimbrial protein and the adjuvant with one or more protein products capable of evoking protective immunity produced by a bacterium that causes a urinary tract infection (UTI).

* * * * *